(12) United States Patent
Metaxatos et al.

(10) Patent No.: US 9,901,855 B2
(45) Date of Patent: Feb. 27, 2018

(54) LIQUID FILTRATION SYSTEMS, COMPONENTS, AND METHODS

(75) Inventors: Paul Metaxatos, Swampscott, MA (US); Joel Nevin, Portsmouth, NH (US); Wes Russell, Bridgeport, TX (US)

(73) Assignee: AQUASANA, INC., Austin, TX (US)

( * ) Notice: Subject to any disclaimer, the term of this patent is extended or adjusted under 35 U.S.C. 154(b) by 301 days.

(21) Appl. No.: 13/252,051

(22) Filed: Oct. 3, 2011

(65) Prior Publication Data

US 2013/0081989 A1    Apr. 4, 2013

(51) Int. Cl.
*B01D 35/30*    (2006.01)

(52) U.S. Cl.
CPC ........... *B01D 35/30* (2013.01); *B01D 35/301* (2013.01); *B01D 2201/24* (2013.01); *B01D 2201/301* (2013.01); *B01D 2201/302* (2013.01); *B01D 2201/4007* (2013.01)

(58) Field of Classification Search
CPC .................. B01D 35/30; B01D 35/301; B01D 2201/4007; B01D 2201/302; B01D 2201/301; B01D 2201/24
USPC .... 210/451, 435, 541, 493.2, 335, 315, 342, 210/232
See application file for complete search history.

(56) References Cited

U.S. PATENT DOCUMENTS

| | | | |
|---|---|---|---|
| 5,486,288 A | 1/1996 | Stanford et al. | 210/235 |
| 6,001,249 A * | 12/1999 | Bailey et al. | 210/232 |
| 6,139,739 A | 10/2000 | Hamlin et al. | 210/315 |
| 7,022,228 B2 | 4/2006 | Hennes et al. | 210/232 |
| 7,147,772 B2 | 12/2006 | Fritze | 210/232 |
| 7,387,726 B2 | 6/2008 | Wolf et al. | 210/232 |
| 9,447,758 B2 * | 9/2016 | Girondi | B01D 29/21 |
| 2005/0092673 A1 | 5/2005 | Fritze | 210/235 |
| 2007/0187316 A1 | 8/2007 | Weinberger et al. | 210/232 |
| 2007/0227963 A1* | 10/2007 | Fick et al. | 210/433.1 |
| 2008/0185330 A1 | 8/2008 | Sinur et al. | 210/238 |
| 2008/0245719 A1* | 10/2008 | Beard et al. | 210/235 |
| 2012/0267293 A1 | 10/2012 | Ardes | 210/109 |

FOREIGN PATENT DOCUMENTS

| | | |
|---|---|---|
| CN | 1223160 | 7/1999 |
| DE | 10 2009 054523 | 6/2011 |
| WO | WO 2002/078816 | 10/2002 |
| WO | WO 2010/123344 | 10/2010 |
| WO | WO 2011/117693 | 9/2011 |

OTHER PUBLICATIONS

International Search Report and Written Opinion issued in PCT Application PCT/US2012/000485, dated Mar. 15, 2013.
EP12838408.8 Extended European Search Report dated Sep. 10, 2015 (5 pages).
First Office Action from the State Intellectual Property Office of China for Application No. 201280058209.2 dated Mar. 31, 2015 (18 pages).

(Continued)

*Primary Examiner* — Madeline Gonzalez
(74) *Attorney, Agent, or Firm* — Michael Best & Friedrich LLP

(57) ABSTRACT

Filter caps, filter assemblies, and filtration systems and methods.

28 Claims, 18 Drawing Sheets

(56) References Cited

OTHER PUBLICATIONS

Second Office Action from the State Intellectual Property Office of China for Application No. 201280058209.2 dated Jan. 27, 2016 (24 pages).
Third Office Action from the State Intellectual Property Office of China for Application No. 201280058209.2 dated Aug. 15, 2016 (21 pages).
Fourth Office Action from the State Intellectual Property Office of China for Application No. 201280058209.2 dated Mar. 1, 2017 (24 pages).

* cited by examiner

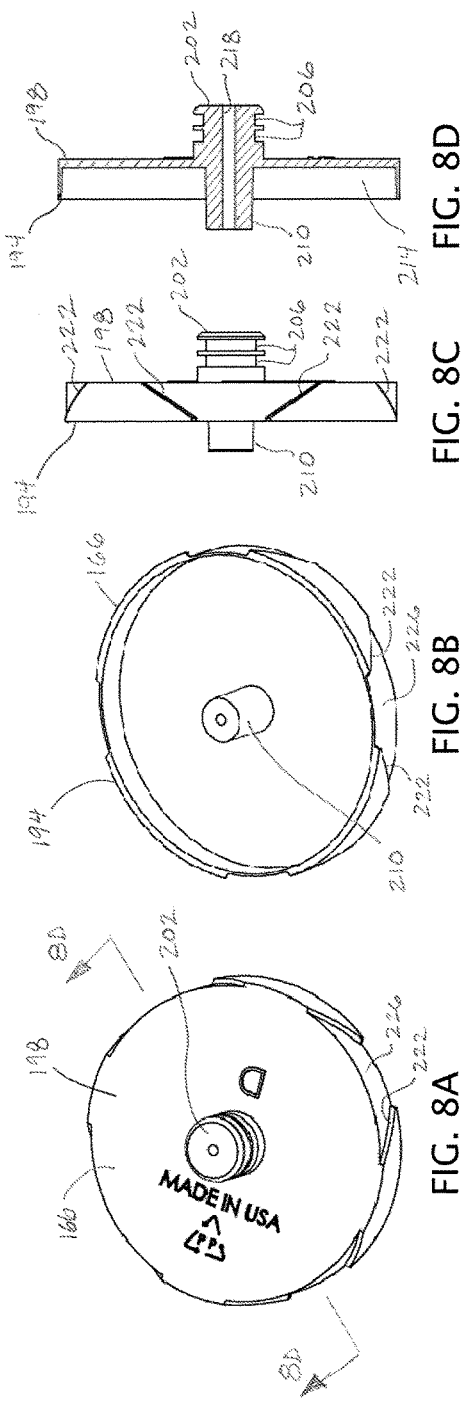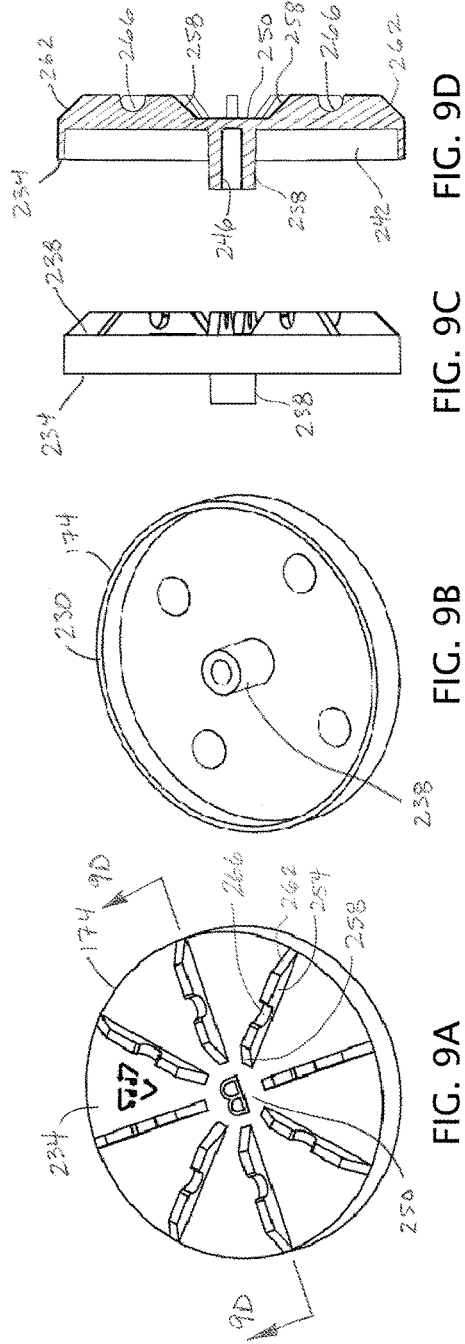

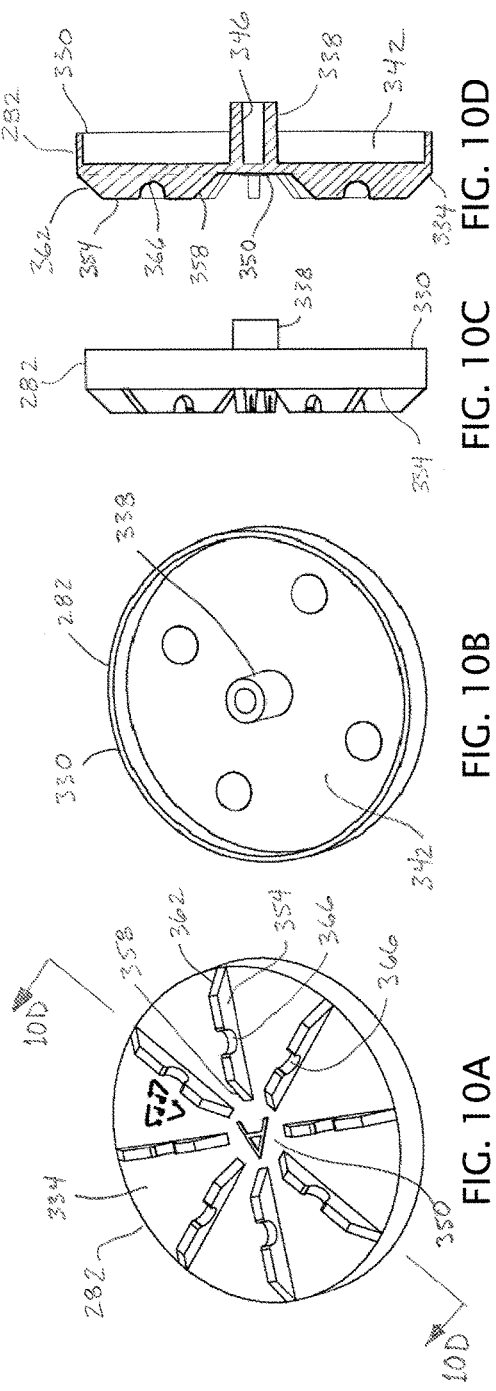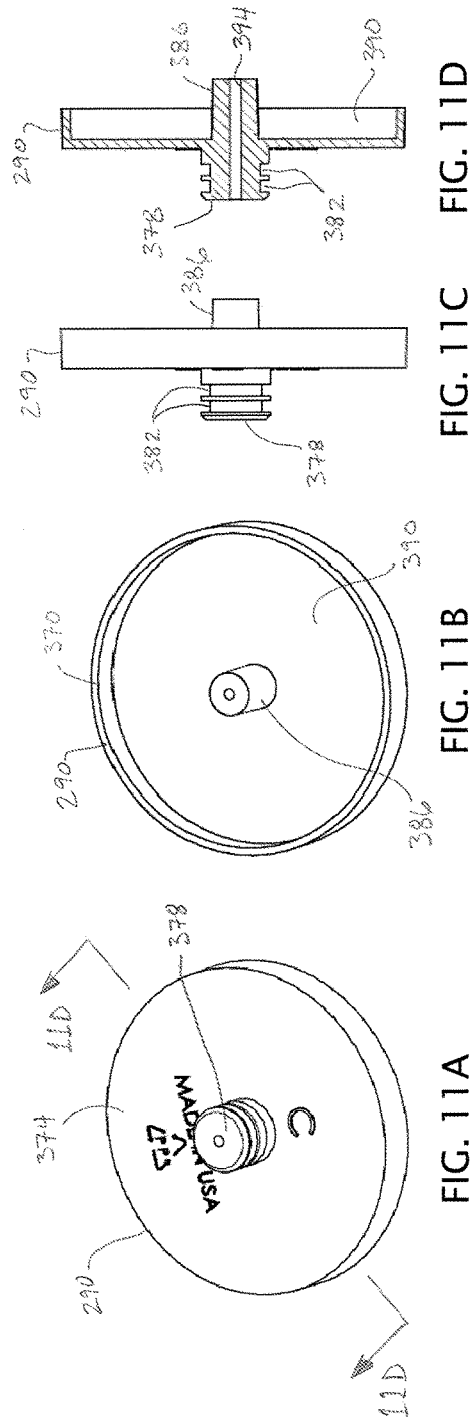

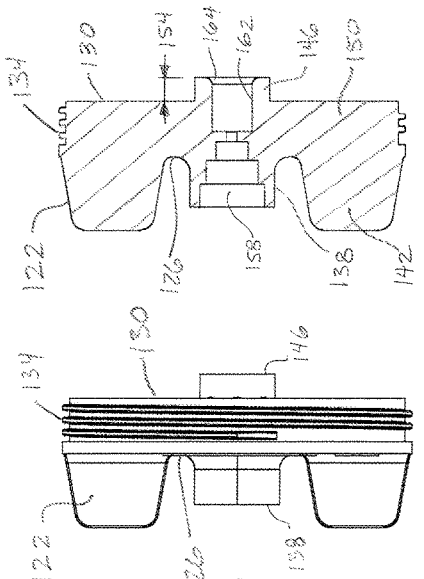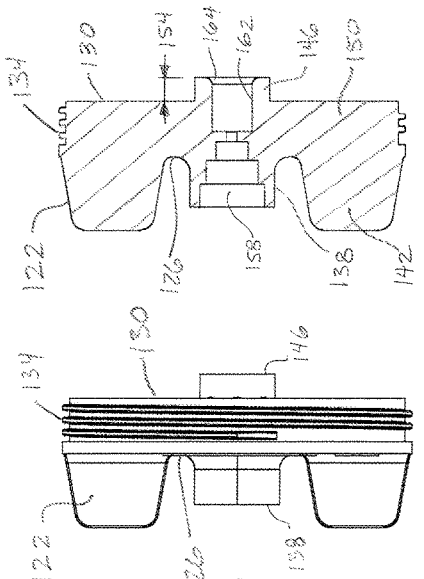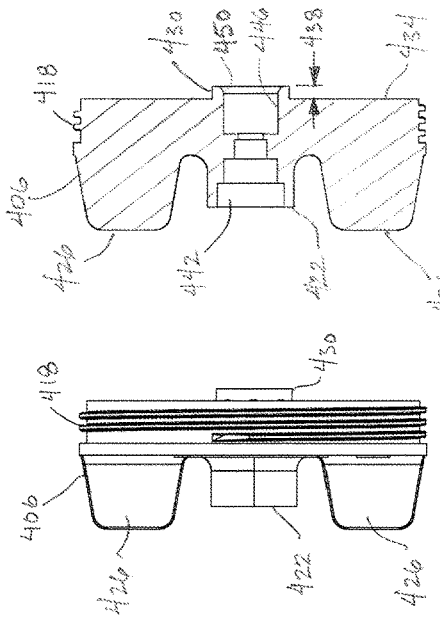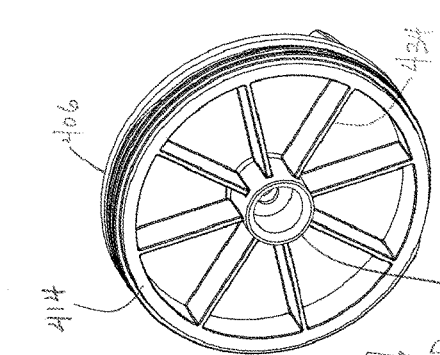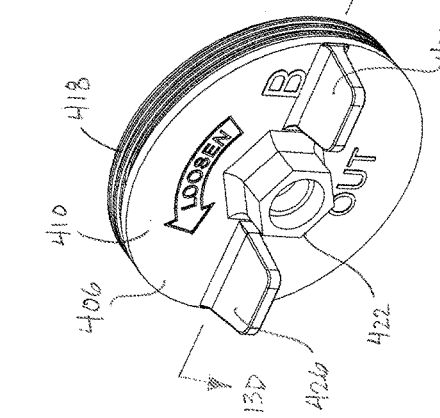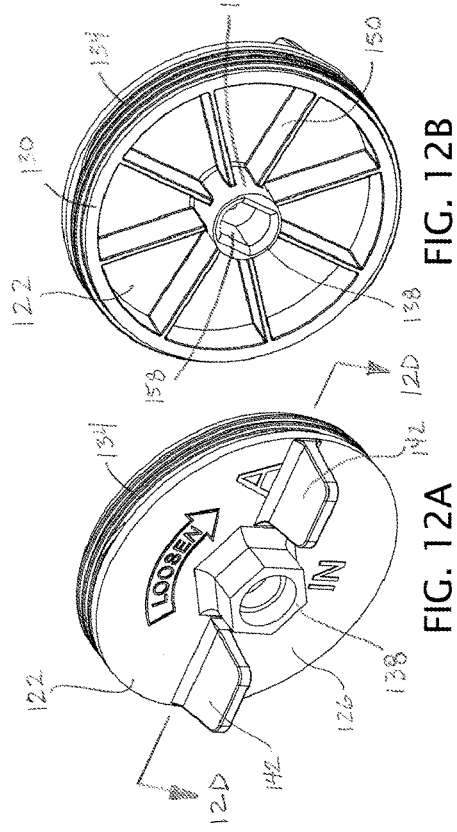

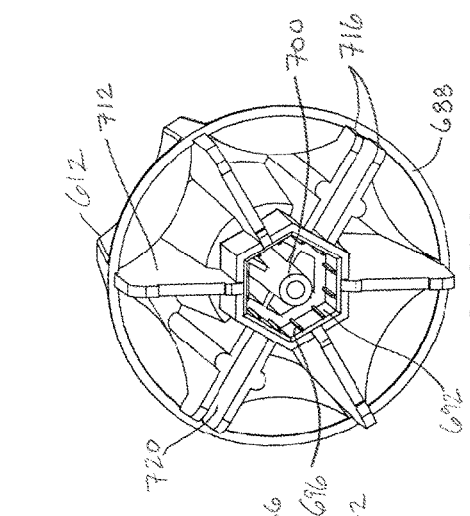
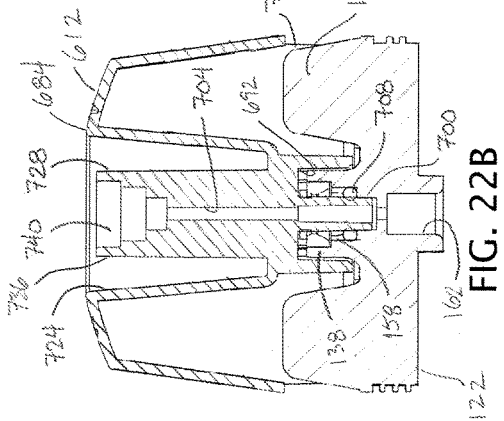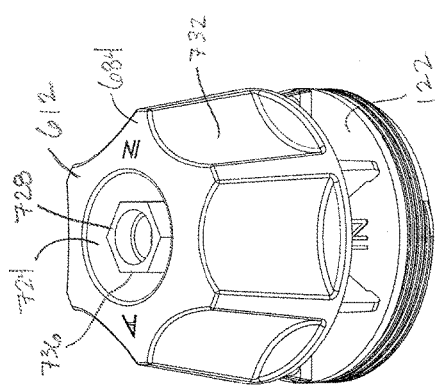
FIG. 22A  FIG. 22B  FIG. 22C
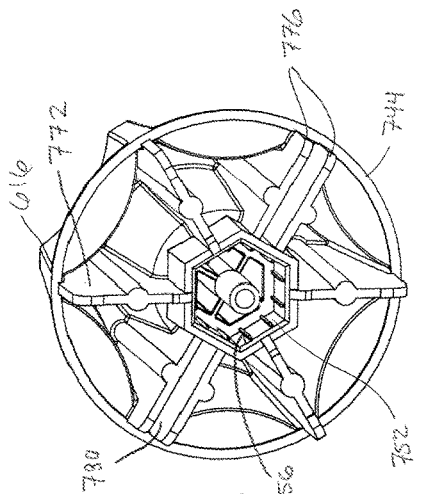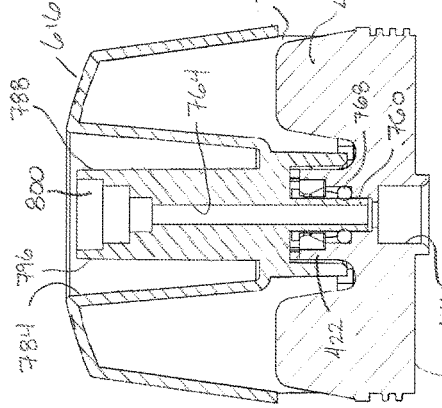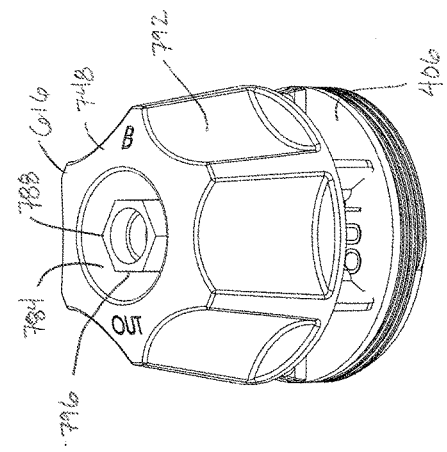
FIG. 23A  FIG. 23B  FIG. 23C

LIQUID FILTRATION SYSTEMS, COMPONENTS, AND METHODS

BACKGROUND

1. Field of the Invention

The present invention relates generally to liquid filtration, more particularly, but not by way of limitation, to liquid filtration systems, components, and methods with improved housing, filter, and filter-cap configurations (e.g., for facilitating filter replacement).

2. Description of Related Art

Examples of filtration systems are disclosed in: (1) U.S. Pat. No. 5,486,288; (2) U.S. Pat. No. 7,147,772; and (3) U.S. patent application Ser. No. 11/013,269, filed Dec. 14, 2004, and published as Pub. No. US 2005/0092673.

SUMMARY

This disclosure includes embodiments of filtration systems, assemblies, apparatuses, and methods.

Some embodiments of the present systems comprise: a filter housing configured to be coupled to one or more filter assemblies, the filter housing having an inlet, an outlet, and a protrusion; a first filter assembly having one or more cam surfaces; where the filter assembly is configured to be coupled to the filter housing such that if the filter assembly is rotated in either direction relative to the filter housing, at least one of the one or more cam surfaces will contact the protrusion to urge the filter assembly away from the protrusion. In some embodiments, the filter housing is configured to be coupled to two or more filter assemblies, and the system further comprises: a second filter assembly configured to be coupled to the filter housing. In some embodiments, the second filter assembly is different than the first filter assembly. In some embodiments, the second filter assembly does not include a cam surface.

Some embodiments of the present systems comprise: a first filter assembly having one or more cam surfaces; a filter housing having a first filter chamber configured to receive the first filter assembly, the filter housing having an inlet, an outlet, and a protrusion extending into the first filter chamber; and a housing cap configured to be coupled to the housing to retain the filter assembly in the filter chamber; where the filter assembly is configured such that if disposed in the filter chamber, the filter assembly can be rotated to cause at least one of the one or more cam surfaces to contact the protrusion and urge the filter assembly away from the protrusion. In some embodiments, the filter housing also has a second filter chamber, and the system further comprises: a second filter assembly configured to be received in the second filter chamber. In some embodiments, the second filter assembly is different than the first filter assembly. In some embodiments, the second filter assembly does not include a cam surface.

Some embodiments of the present systems comprise: a filter housing configured to be coupled to one or more filter assemblies, the filter housing having three or more protrusions; a first filter assembly having three or more cam surfaces; where the first filter assembly is configured to be coupled to the filter housing such that if the first filter assembly is rotated relative to the filter housing, the cam surfaces will contact the protrusions to urge the filter assembly away from the protrusions. In some embodiments, the filter housing is configured to be coupled to two or more filter assemblies, and the system further comprises: a second filter assembly configured to be coupled to the filter housing. In some embodiments, the second filter assembly is different than the first filter assembly. In some embodiments, the second filter assembly does not include a cam surface.

Some embodiments of the present systems further comprise: a shroud configured to be coupled to the filter housing to cover at least a portion of the filter housing. In some embodiments, the filter housing has a base portion and a distal portion spaced apart from the base, and the shroud is configured to extend over the base portion. In some embodiments, the shroud is configured to be coupled to a housing mount to suspend the shroud and the filter housing from the housing mount. In some embodiments, the first filter assembly includes a first filter cap with a circular perimeter, and each cam surface extends inward from the circular perimeter. In some embodiments, each cam surface is helical. In some embodiments, the first filter cap includes an first end, a second end, and a plurality of recesses extending inwardly from the circular perimeter between the first end and the second end, each recess defining at least one cam surface. In some embodiments, each recess extends from the first end to the second end, and defines two opposing cam surfaces. In some embodiments, each recess is configured such that one of the two opposing cam surfaces defined by that recess is angled in a first direction, and the other of the two opposing cam surfaces defined by that recess is angled in a second direction substantially opposite to the first direction.

Some embodiments of the present systems further comprise: a second filter housing that is substantially similar to the first filter housing; and a second filter assembly that is substantially similar to the first filter assembly; where the first filter housing is configured to be coupled to the first filter housing.

Some embodiments of the presents apparatuses comprise: a first filter cap configured to be coupled to a filter as at least part of a filter assembly, the first filter cap comprising one or more cam surfaces configured such that if the filter assembly is disposed in a filter chamber of a filter housing having a protrusion extending into the filter chamber, the first filter cap can be rotated in either direction relative to the filter housing to cause at least one of the one or more cam surfaces to contact the protrusion and urge the first filter cap away from the protrusion.

Some embodiments of the present apparatuses comprise: a first filter cap configured to be coupled to a filter as at least part of a filter assembly, the first filter cap comprising three or more cam surfaces configured such that if the filter assembly is disposed in a filter chamber of a filter housing having three or more protrusions extending into the filter chamber, the first filter cap can be rotated in either direction relative to the filter housing to cause at least three of the three or more cam surfaces to each contact one of the protrusions and urge the first filter cap away from the protrusion.

Some embodiments of the present apparatuses comprise: a first filter cap configured to be coupled to a filter as at least part of a filter assembly, the first filter cap comprising one or more cam surfaces configured such that if the filter assembly is disposed but not retained in a filter chamber of a filter housing having one or more protrusions extending into the filter chamber, the first filter cap can be rotated relative to the filter housing to cause at least one of the one or more cam surfaces to contact the protrusion and urge the first filter cap away from the protrusion.

In some embodiments of the present apparatuses, the first filter cap has a circular perimeter, and each cam surface extends inward from the circular perimeter. In some embodiments, each cam surface is helical. In some embodiments, the first filter cap includes an first end, a second end, and a plurality of recesses extending inward from the circular perimeter between the first end and the second end, each recess defining at least one cam surface. In some embodiments, each recess extends from the first end to the second end, and defines two opposing cam surfaces. In some embodiments, each recess is configured such that one of the two opposing cam surfaces defined by that recess is angled in a first direction, and the second of the two opposing cam surfaces defined by that recess is angled in a second direction substantially opposite to the first direction.

Some embodiments of the present apparatuses further comprise: a filter having a first end and a second end; where the filter cap is coupled to the first end of the filter. Some embodiments further comprise: a second filter cap coupled to the second end of the filter.

In some embodiments, one of more of the present cam surfaces of a given filter assembly (including those described above), will, if projected onto a plane oriented parallel to the longitudinal axis of the filter assembly of which they are apart, form a straight line on that plane. The same is true for the corresponding projections of any related filter housing.

Some embodiments of the present filters (including those described above) may comprise carbon, and, more specifically, may be characterizable as activated carbon filtration filters, and/or may have one or more of the following features: an operating pressure range of 20-50 pounds per square inch, a rated capacity of 500 gallons, a maximum operating temperature of 90 degrees Fahrenheit, a maximum flow rate of 0.4 gallons per minute.

Some embodiments of the present methods comprise: separating a filter assembly from a filter housing, where the filter assembly includes a filter coupled to a first filter cap having three or more cam surfaces and the filter housing has a filter chamber and three or more protrusions extending into the filter chamber, the removing including rotating the filter assembly about its longitudinal axis such that interference between the at least three of the three or more cam surfaces a corresponding number of the protrusions urges the first filter cap away from the protrusions, thus tending to separate the filter assembly from the filter housing. In other embodiments of the present methods, fewer or more cam surfaces and protrusions may be used.

Any embodiment of any of the present systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 8A-8D are various views of one of the present filter caps of the filter assemblies shown in FIGS. 7A-7B.

FIGS. 9A-9D are various views of a second one of the present filter caps.

FIGS. 10A-10D are various views of a third one of the present filter caps.

FIGS. 11A-11D are various views of a second one of the present filter caps.

FIGS. 12A-12D are various views of one of the present housing caps of the assembly of FIGS. 1-3.

FIGS. 13A-13D are various views of a second one of the present housing caps.

FIGS. 22A-22C are various views of one of the present undermount housing knob of the assembly of FIGS. 17A-17B.

FIGS. 23A-23C are various views of a second one of the present undermount housing knob of the assembly of FIGS. 17A-17B.

FIGS. 25A-27C depict various views of alternative embodiments of the filter cap of FIGS. 8A-8C.

DESCRIPTION OF ILLUSTRATIVE EMBODIMENTS

Figure 1:
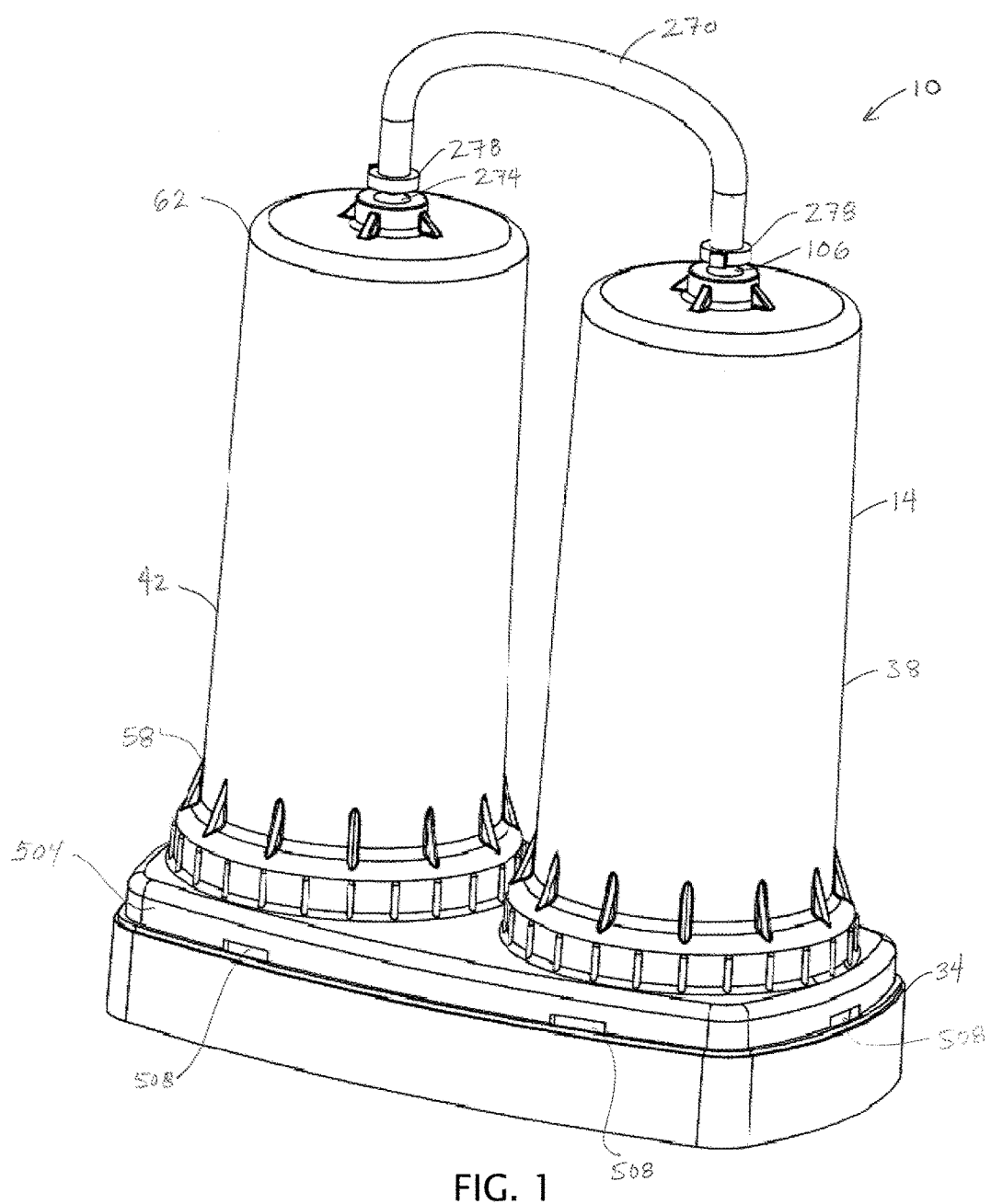
FIGS. 1-3 are various views of one embodiment of the present filtration assemblies.
Figure 2:
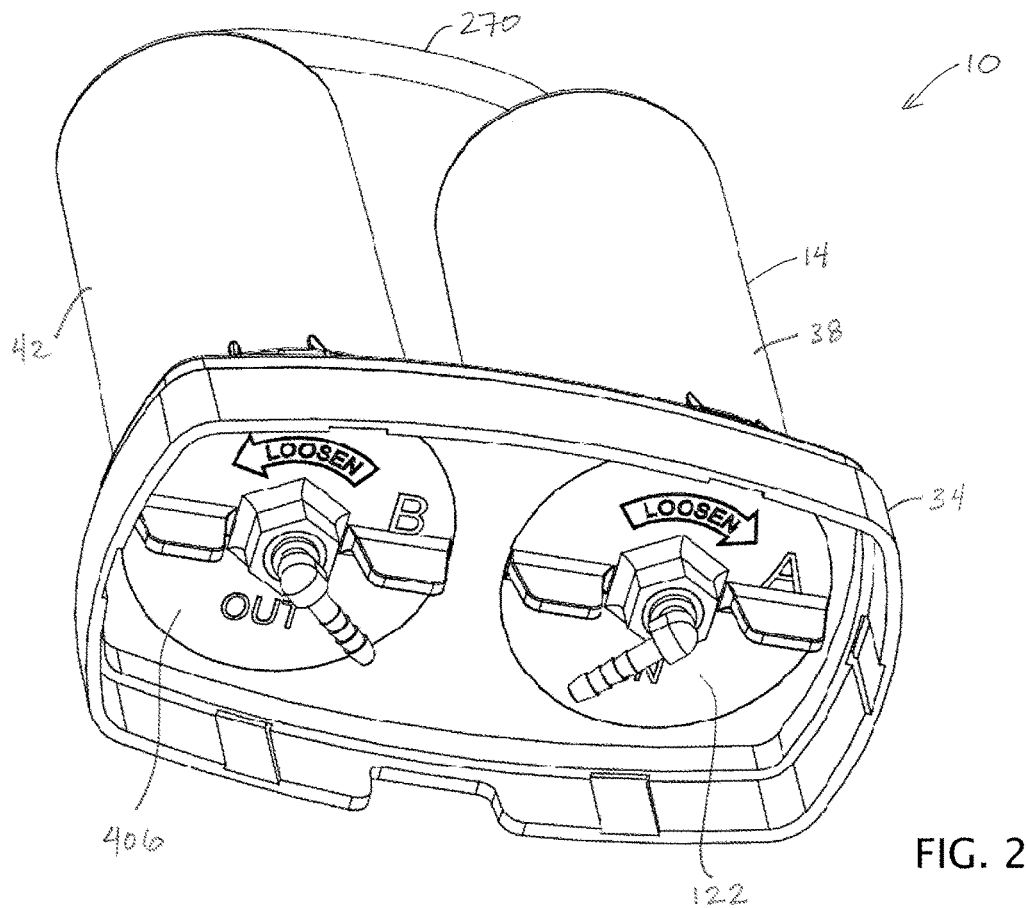
Figure 3:
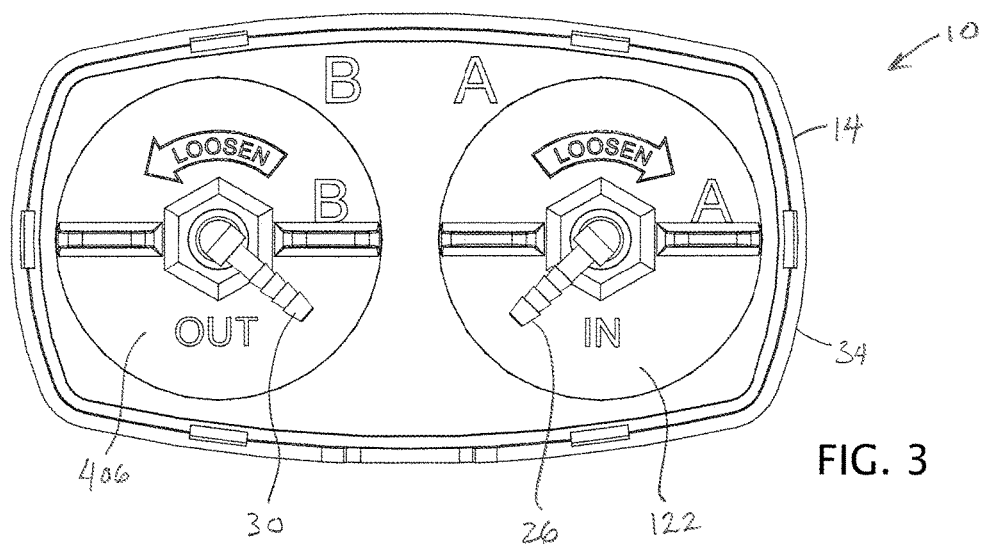

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus) that is configured in a certain way is configured in at least that way, but it can also be configured in other ways than those specifically described.

Referring now to the drawings, and more particularly to FIGS. 1-14, shown and designated by reference numeral 10 is an embodiment of the present filtration assemblies, such as may be used, for example, for filtering tap water for drinking and the like, as well as various components of assembly 10. In the embodiment shown, assembly 10 comprises a filter housing 14, a first filter assembly 18, and a second filter assembly 22. Filter housing 14 is configured to be coupled to one or more filter assemblies (e.g., two, in the embodiment shown), and includes an inlet 26 configured to receive a liquid to be filtered, and an outlet 30 configured to permit filtered liquid to exit the housing. In the embodiment shown, inlet 26 and outlet 30 comprise right-angle or elbow fittings. In other embodiments, inlet 26 and outlet 30 can comprise any suitable fittings (e.g., straight fittings, etc.). In the embodiment shown, housing 14 includes a base portion 34, a first elongated portion 38 extending from the base portion, and a second elongated portion 42 extending from the base portion.

Figure 6:
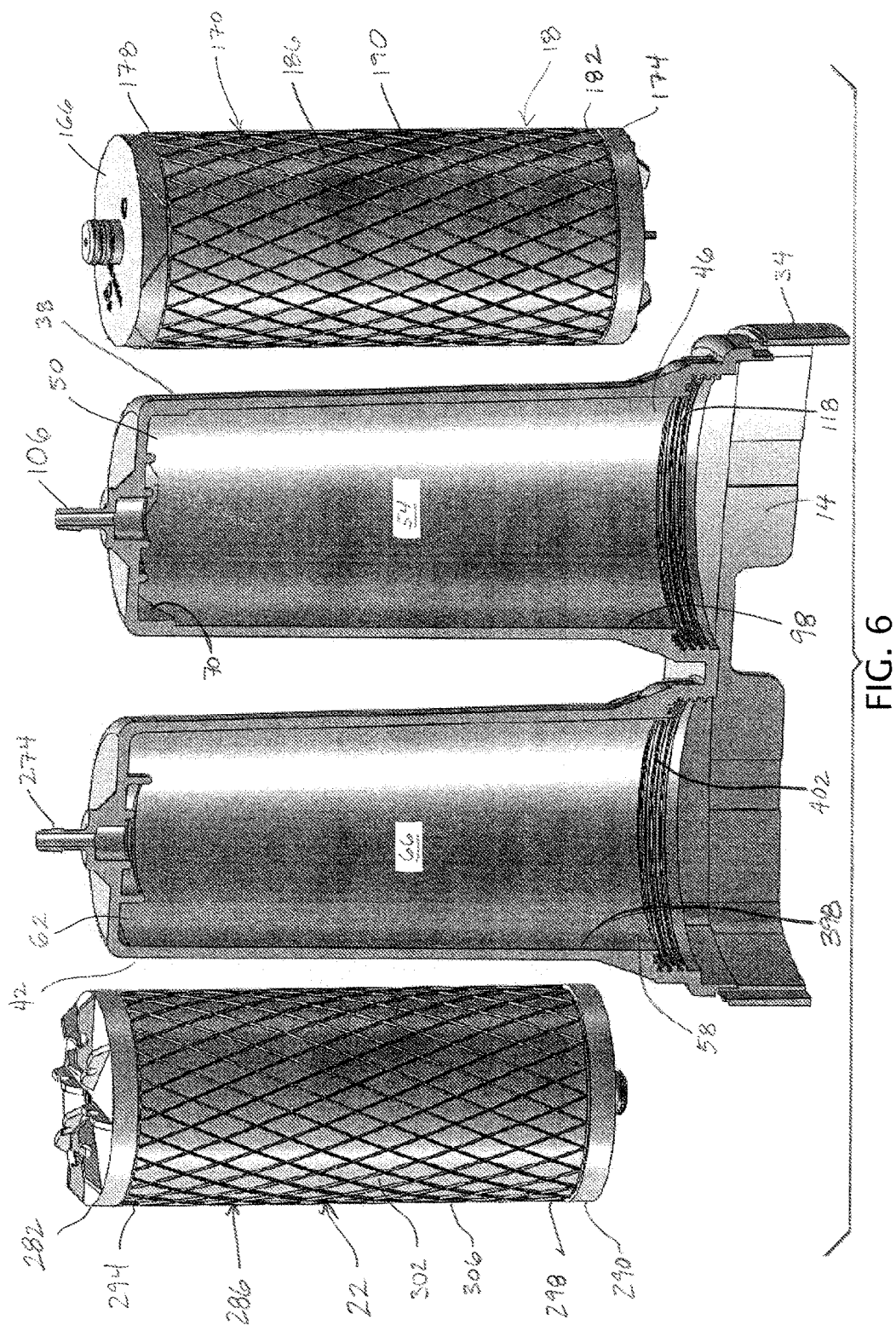
FIG. 6 is a cross-sectional view of the housing of FIG. 4, shown with two filter assemblies.
Figure 7A:
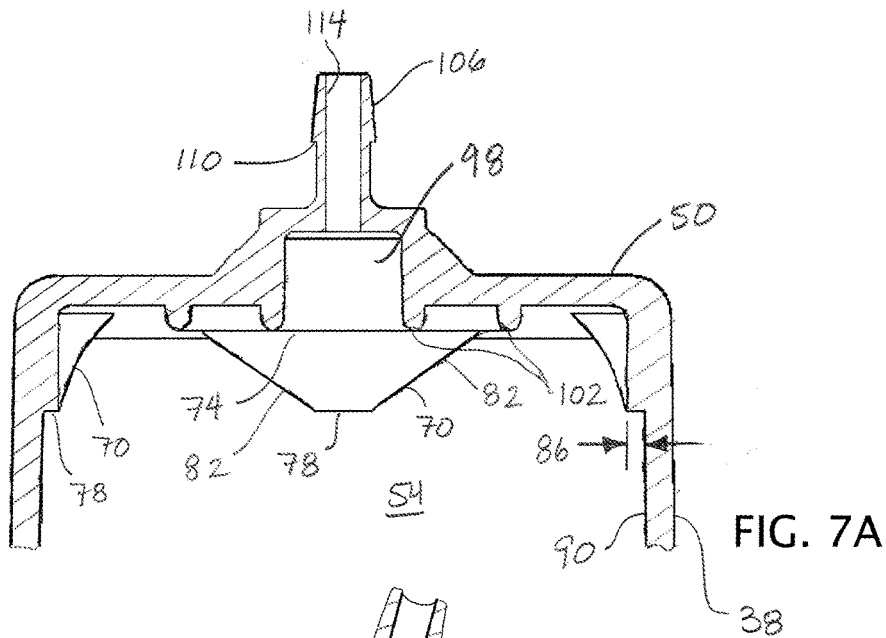
FIGS. 7A-7B are enlarged cross-sectional plan and cross-sectional perspective views, respectively, of a first portion of the housing of FIG. 4.
Figure 7B:
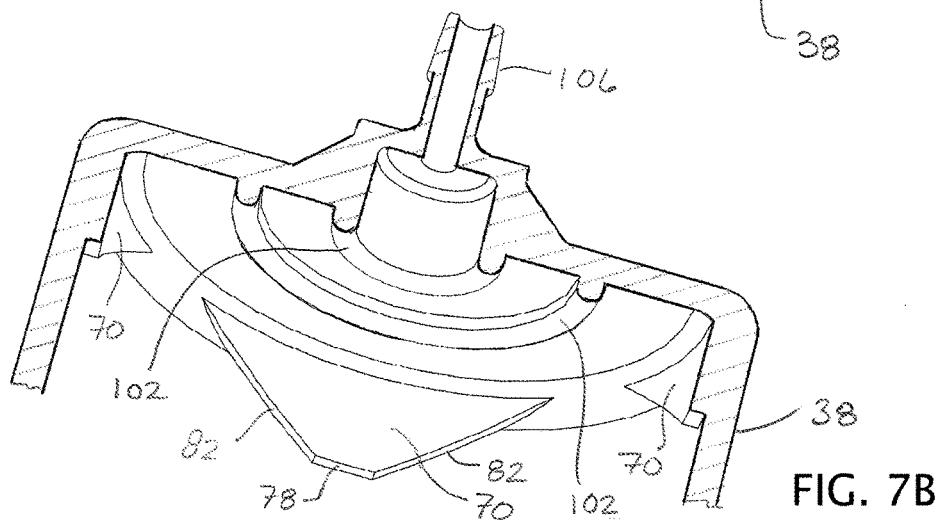

As shown in FIGS. 6 and 7A-7B, portion 38 of housing 14 includes a first or proximal end 46 and a second or distal end 50, and a first filter chamber 54 extending between first end 46 and second end 50. Similarly, portion 42 of housing 14 includes a first or proximal end 58 and a second or distal end 62, and a second filter chamber 66 extending between first end 58 and second end 62. In some embodiments, portion 38 of housing 14 includes one or more protrusions 70 configured to contact first filter assembly 18 if first filter assembly 18 is coupled to housing 14 (e.g., received in first filter housing 18) and/or rotated in either direction (clockwise or counterclockwise) relative to housing 14 such that at least one of one or more cam surfaces on the first filter assembly will contact the protrusion to urge the first filter assembly away from the protrusion, as described in more detail below. For example, in the embodiment shown, portion 38 includes four protrusions 70 extending into first filter chamber 54.

In the embodiment shown, each protrusion is generally shaped as a truncated triangle with a base 74, a relatively narrower tip 78, and a pair of sides 82 extending between base 74 and tip 78. In the embodiment shown, protrusions 70 have a substantially constant depth 86 projecting inward from a substantially cylindrical inner sidewall 90 of housing 14, such that sides 82 have a curved and/or helical profile. In other embodiments, protrusions 70 can have any suitable shape. For example, base 74 and tip 78 can be provided with substantially equal widths such that the protrusion has a substantially rectangular shape, tip 78 can be rounded, and/or the protrusions can be provided with any suitable shape. In some embodiments, at least one of the protrusions can be provided with a shape that differs from the shape of at least one of the other protrusions. In the embodiment shown, portion 38 of housing 14 also includes a cylindrical recess 98 having a diameter that is less than the diameter of chamber 54 at second end 50, such that recess 98 is sized to receive a nipple of first filter assembly 18 (e.g., nipple 202 of first filter cap 166, as shown in FIGS. 8A-8D). In the embodiment shown, portion 38 of housing 14 also includes a pair of circular ridges 102 protruding into chamber 54 toward first end 46, and concentric with each other and with passageway 114. In the embodiment shown, portion 38 of housing 14 further includes an intermediate outlet or nipple 106 extending from second end 50, with nipple 106 including a tapered ridge 110 for resisting removal of a tube or hose, and passageway 114 extending through nipple 106 and in fluid communication with recess 98.

In some embodiments, such as the one shown in FIG. 7A, projection 70 is configured such that if projected onto the cross-sectional plane of FIG. 7A, each of sides 82 forms a straight line on the cross-sectional plane disposed at an angle relative to the central longitudinal axis of portion 38 (and filter chamber 54).

In the embodiment shown, interior sidewall 90 includes female threads 118 at or near first end 46 of housing 14, with threads 118 configured to engage a first housing cap 122 (FIGS. 12A-12D) that is configured to be coupled to the housing to retain first filter assembly 18 in filter chamber 54. In the embodiment shown, filter cap 122 has a circular shape, with a first outer end 126 and a second inner end 130. In the embodiment shown, inner end 130 includes male threads 134 configured to correspond to female threads 118 of housing 14; and outer end 126 includes a central projection 138 (e.g., with a hexagonal shape, as shown, that can be engaged by a wrench or socket), and a pair of wings 142 configured to be grasped or pushed (e.g., by a user's hand) such as to rotate cap 122 relative to housing 14 to engage or disengage threads 134 and 118 when coupling or de-coupling cap 122 and housing 14. In the embodiment shown, inner end 130 of cap 122 includes a cylindrical projection 146 configured to extend into first filter chamber 54 when cap 122 is coupled to housing 14, and a plurality of ridges 150 extending radially outward from projection 146. As shown, projection 146 extends a distance 154 from ridges 150.

In the embodiment shown, projection 138 includes a stepped recess 158 configured to receive and permit sealing of a nipple fitting (inlet 26), such as, for example, via threads, adhesive, one or more O-rings, and/or the like. In other embodiments, recess 158 can have any suitable shape, and/or cap 122 and nipple 26 can be unitary. In the embodiment shown, projection 146 includes a recess 162 that is in fluid communication with recess 158, and that has a flared inner end 164, as shown. In the embodiment shown, recess 162 has a non-circular cross-sectional shape (e.g., to prevent nipple 202 of filter cap 166 from being inserted into recess 162, such as, for example, to prevent first filter assembly 18 from being coupled to the housing in the wrong direction or orientation relative to the housing). For example, in the embodiment shown, recess 162 includes two flat sizes that reduce the size of an otherwise circular shape.

Figure 18:
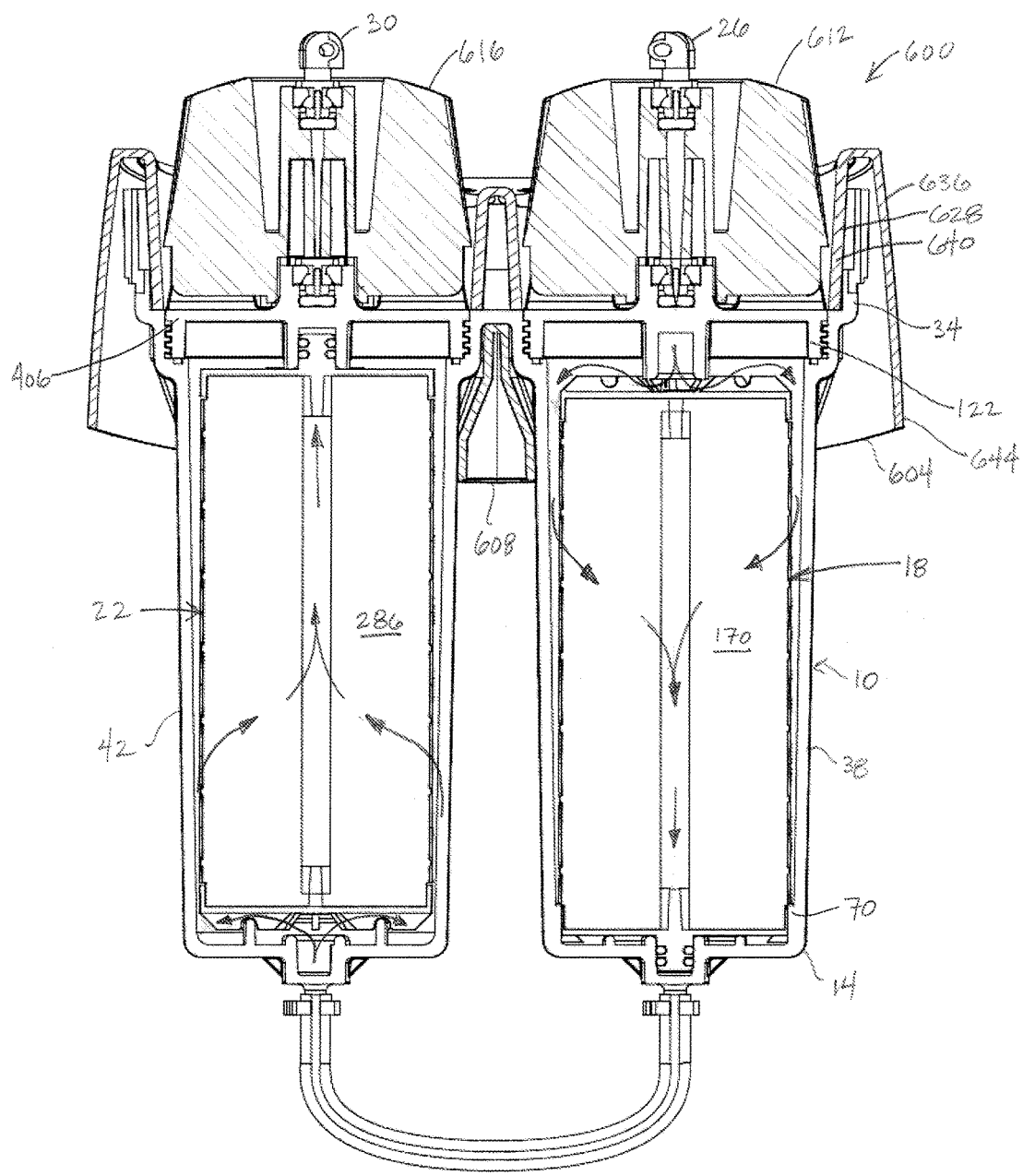
FIG. 18 is a cross-sectional view of the assembly of FIGS. 17A-17B.
Figure 19:
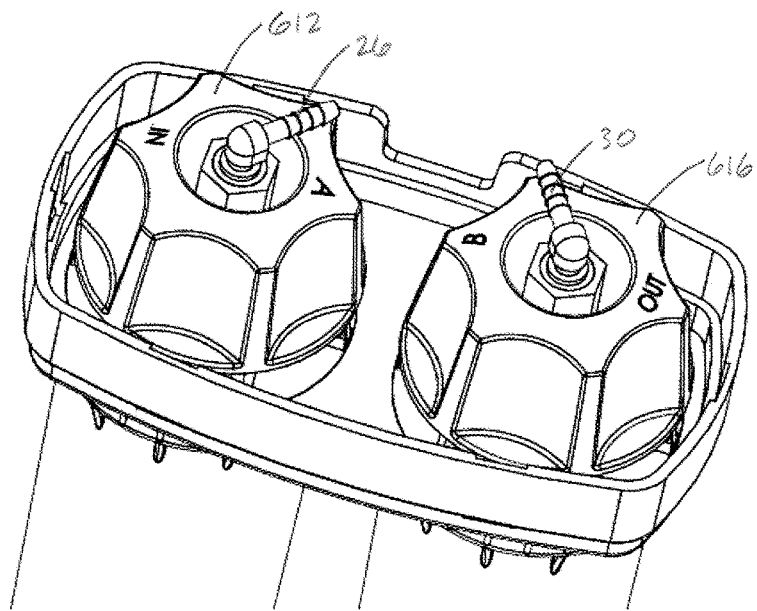
FIG. 19 is a perspective view of a portion of the assembly of FIGS. 17A-17B.
Figure 20:
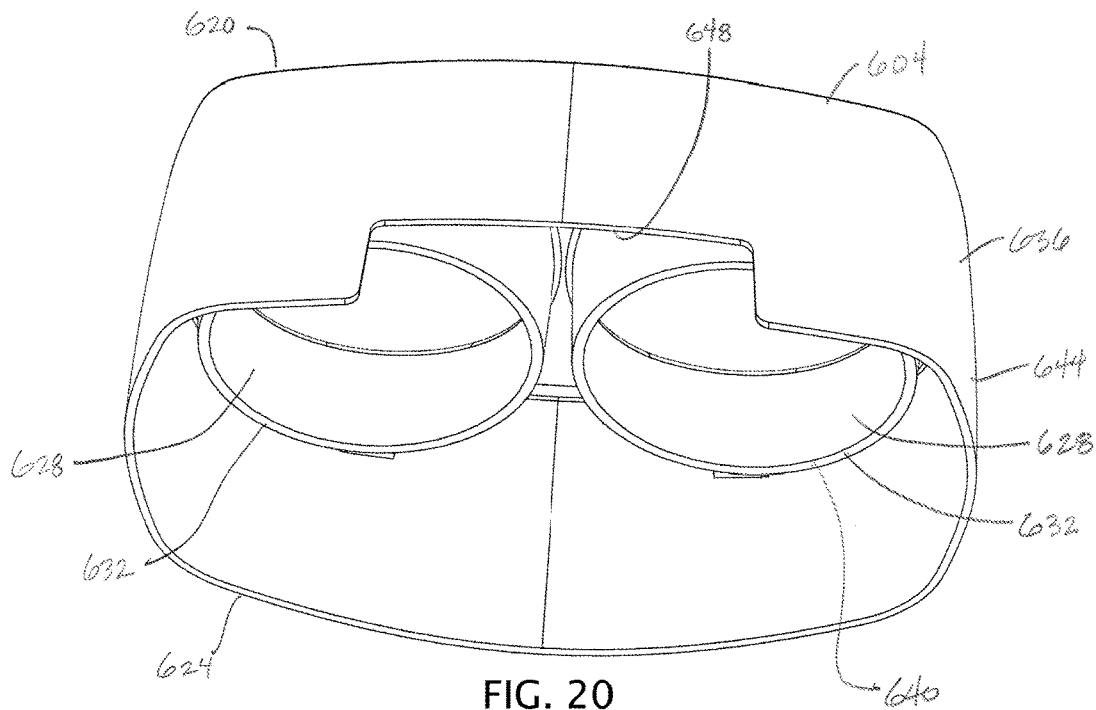
FIG. 20 is a perspective view of an undermount shroud of the assembly of FIGS. 17A-17B.
Figure 21A:
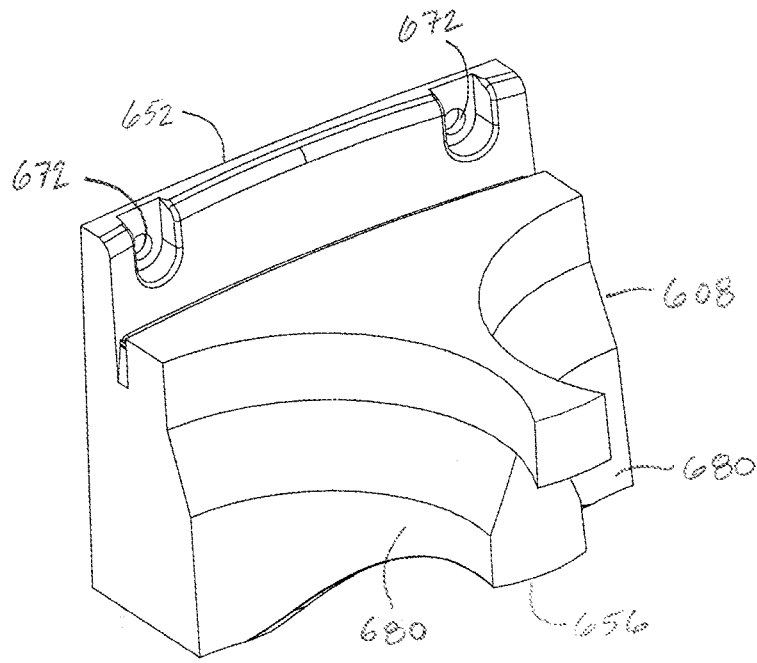
FIGS. 21A-21B are front and rear perspective views of an undermount bracket of the assembly of FIGS. 17A-17B.
Figure 21B:
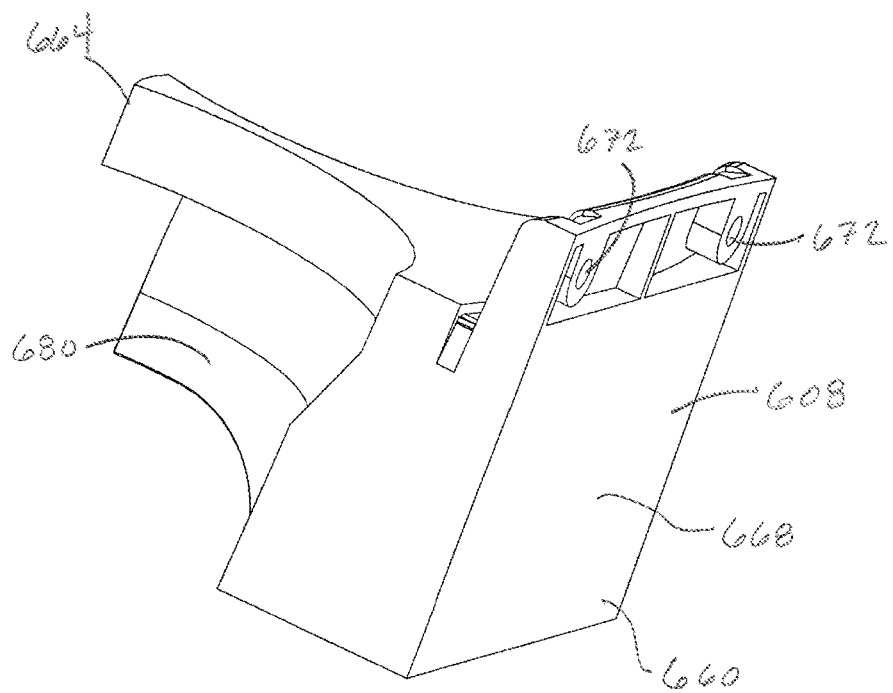

In the embodiment shown, first filter assembly 18 comprises a first filter cap 166, a filter 170, and a second filter cap 174. As shown, first filter cap 166 is configured to be coupled to a first end 178 of filter 170, and second filter cap 174 is configured to be coupled to a second end 182 of filter 170. In the embodiment shown, filter 170 comprise a filter material 186 (e.g., a filter fabric or other fibrous material, or any other suitable filter material) and a mesh or netting 190 surrounding the filter material and comprising, for example, metal, plastic, or another suitably durable material. Mesh 190, for example, can provide support, protection, and/or a degree of structural rigidity to filter 170. In the embodiment shown, filter 170 has a hollow passageway (646, as shown in FIG. 18) extending through the center of the filter from first end 178 to second end 182. In the embodiment shown, filter 170 can be substantially similar to the filter found in the Model AQ-4000 or AQ-4025 filter assemblies (e.g., with Cartridge A of either Model corresponding to first filter assembly 18, and Cartridge B of either Model corresponding to second filter assembly 22) available from Sun Water Systems, Austin, Tex., USA. As such, the filters of filter assemblies 18 and 22 may (like the filters in the Sun Water System filter assemblies models just described) comprise carbon, and, more specifically, may be characterizable as activated carbon filtration filters (such as those configured to remove impurities from water), and/or may have one or more of the following features: an operating pressure range of 20-50 pounds per square inch, a rated capacity of 500 gallons, a maximum operating temperature of 90 degrees Fahrenheit, a maximum flow rate of 0.4 gallons per minute.

As shown in FIGS. 8A-8D, first filter cap 166 has a first or inner end 194 configured to face filter 170, and a second or external end 198 configured to face away from filter 170. In the embodiment shown, filter cap 166 includes a nipple 202 projecting from second end 198, and configured to extend into recess 98 of housing 14 if first filter assembly 18 is disposed in first filter chamber 54. In the embodiment shown, nipple 202 includes one or more peripheral grooves 206, each configured to receive an O-ring to provide a seal between nipple 202 and the surface of housing 14 that defines recess 98 in housing 14. In the embodiment shown, inner end 194 of filter cap 166 includes a cylindrical projection 210 configured to extend into the central passageway of filter 170 (e.g., the outer diameter of projection 210 is substantially equal to the inner diameter of the central passageway in filter 170), and an annular recess 214 configured to receive first end 178 of filter 170 (e.g., with an outer diameter substantially equal to the outer diameter of filter 170), both to help ensure that substantially all water flowing out first end 178 of filter 170 through the central passageway will flow through filter cap 166, as described in more detail below), and to help ensure that filter 170 can be securely coupled in fixed relation to filter cap 174, at least when first filter assembly 18 is disposed in filter chamber 54. As shown, filter cap 166 further includes a passageway 218 extending through nipple 202 and projection 210 to permit water to flow through cap 166, as described in more detail below.

Figure 24:
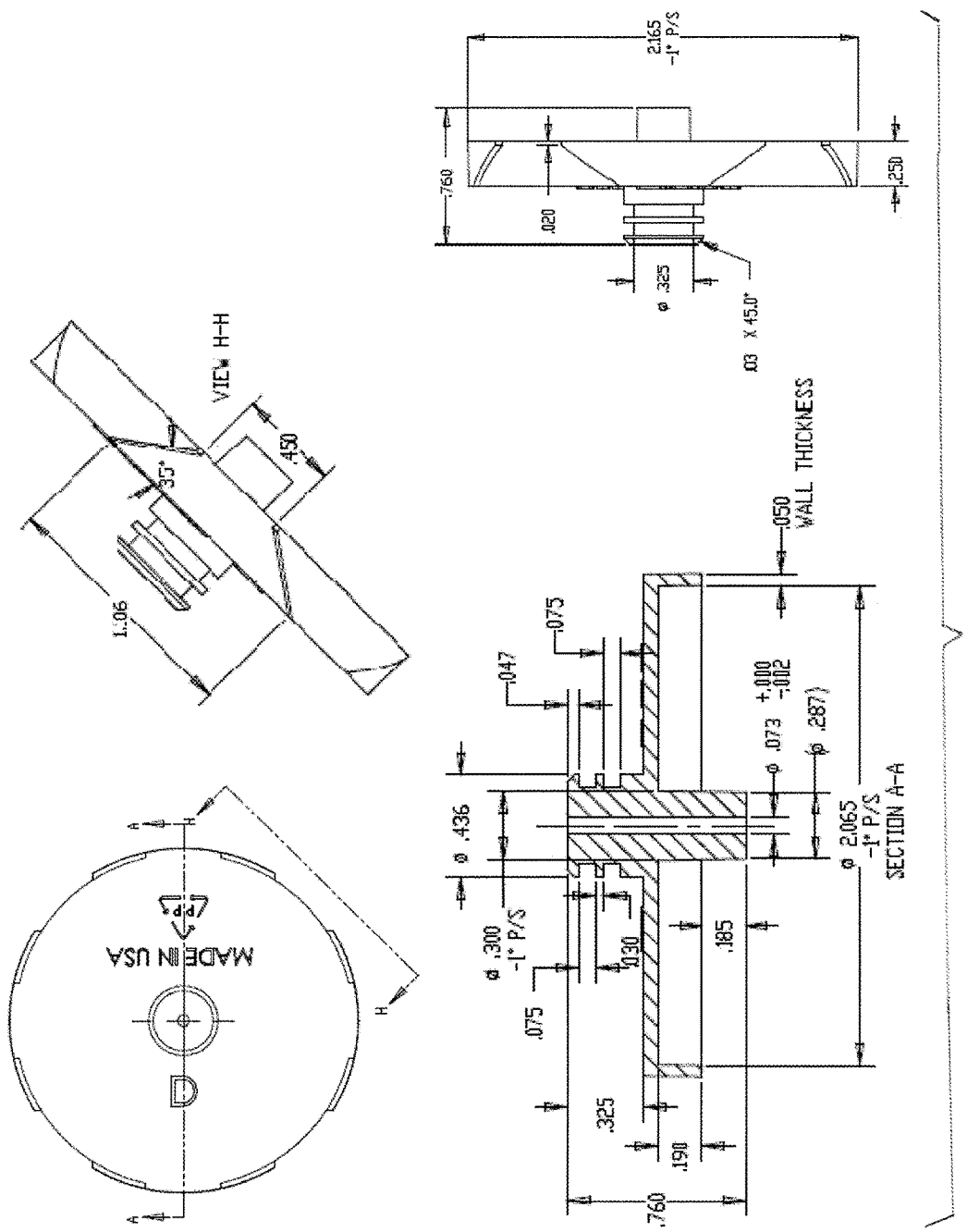
FIG. 24 shows various views of an embodiment of the filter cap of FIGS. 8A-8C.

In the embodiment shown, filter cap 166 includes one or more (e.g., four, as shown) cam surfaces 222 configured such that if disposed (e.g., but not retained) in filter chamber 54 (e.g., on first filter assembly 18), filter cap 166 (and, more broadly, first filter assembly 18) can be rotated in either direction (clockwise or counterclockwise) relative to housing 14 to cause at least one of cam surfaces 222 to contact at least one protrusion 70 and urge filter cap 166 (and, more broadly, first filter assembly 18) away from the at least one protrusion (and, e.g., in a direction out of filter chamber 54). In some embodiments, filter cap 166 can include three or more cam surfaces 222 (e.g., as in the embodiment shown), and can be configured to be rotated in filter chamber 54 in either direction relative to filter housing 14 to cause at least three of cam surfaces 222 to each contact one of protrusions 70 and urge filter cap 166 away from the respective protrusion. In the embodiment shown, filter cap 166 has a substantially circular perimeter (e.g., when looking at either inner end 194 or outer end 198), and each cam surface 222 extends inward (e.g., radially inward toward passageway 218) from the circular perimeter. More particularly, in the embodiment shown, filter cap 166 includes a plurality of recesses 226 extending inward from the circular perimeter between first end 194 and second end 198 (e.g., from first end 194 to second end 198), with each recess 226 defining at least one cam surface 222 (e.g., defining two opposing cam surfaces 222, as shown). In the embodiment shown, each recess 226 is configured such that one of the two opposing cam surfaces defined by that recess is angled in a first direction, and the second of the two opposing cam surfaces defined by that recess is angled in a second direction substantially opposite to (e.g., a mirror image of) the first direction, such that, for example, the recess has the shape of a truncated triangle. For example, in the embodiment shown, each recess 226 has a shape that is configured to receive a protrusion 70 when first filter assembly 18 is disposed in filter chamber 54, and that is complementary to the shape of the respective protrusion 70. In the embodiment shown, each cam surface 222 follows the contour of the outer circular perimeter of cap 166 such that the cam surface is helical. FIG. 24, for example, shows various views and dimensions of one embodiment of first filter cap 166.

As shown in FIGS. 9A-9D, second filter cap 174 has a first or inner end 230 configured to face filter 170, and a second or external end 234 configured to face away from filter 170. In the embodiment shown, inner end 230 of filter cap 174 includes a cylindrical projection 238 configured to extend into the central passageway of filter 170 (e.g., the outer diameter of projection 238 is substantially equal to the inner diameter of the central passageway in filter 170), and an annular recess 242 having configured to receive second end 182 of filter 170 (e.g., with an outer diameter substantially equal to the outer diameter of filter 170), both to help ensure that filter 170 can be securely coupled in fixed relation to filter cap 174, at least when first filter assembly 18 disposed in filter chamber 54. As shown, while projection 238 can include a recess 246, filter cap 174 does not include a passageway extending through projection 238, such that water is not permitted flow through cap 174.

In the embodiment shown, outer end 234 of cap 174 includes a substantially flat central portion 250, and a plurality of ribs 254 projecting outward from end 234, and extending radially from portion 250 towards the circular perimeter of cap 174. In the embodiment shown, each rib includes a tapered inner end 258, a tapered outer end 262, and a recess 266 between inner end 258 and outer end 262. In the embodiment shown, recesses (or notches) 266 are each at an equal distance from the respective inner end 258, such that recesses 266 of ribs 254 lie in a circular path around portion 250. In the embodiment shown, recesses 266 are each formed such that the portion of the recess that is closest to end 234 is spaced above or apart from end 234, as shown. In the embodiment shown, inner ends 258 of ribs 254 are positioned such that inner ends 258 will prevent cylindrical protrusion 146 of housing cap 122 from contacting central portion 250 (e.g., to maintain a space between protrusion 146 and central portion 250) such that the water can flow out passageway 162 and between ridges 254 to filter chamber 54 and filter 170.

Figure 4:
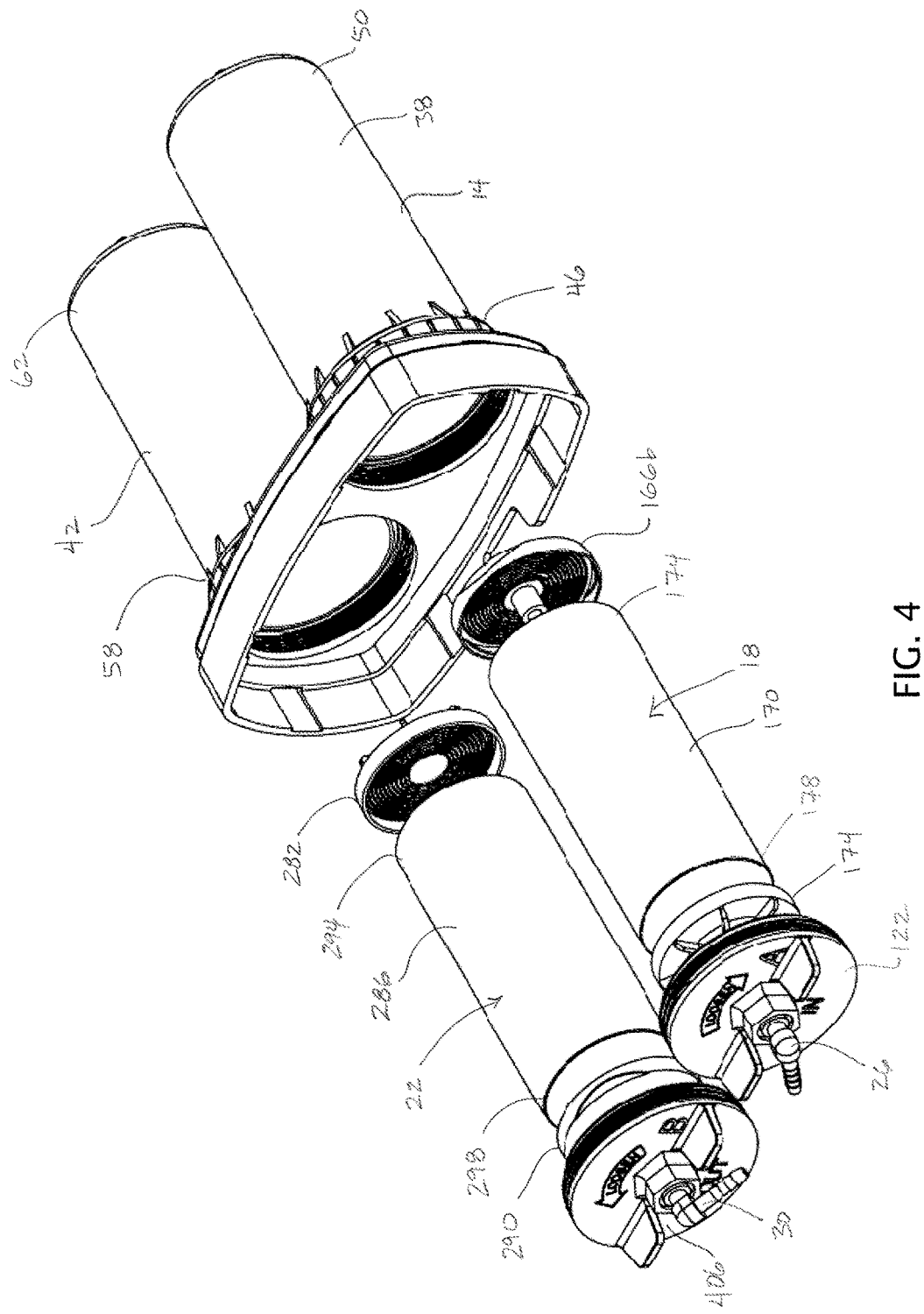
FIG. 4 is an exploded perspective view of a slight variation of the assembly of FIGS. 1-3.
Figure 5:
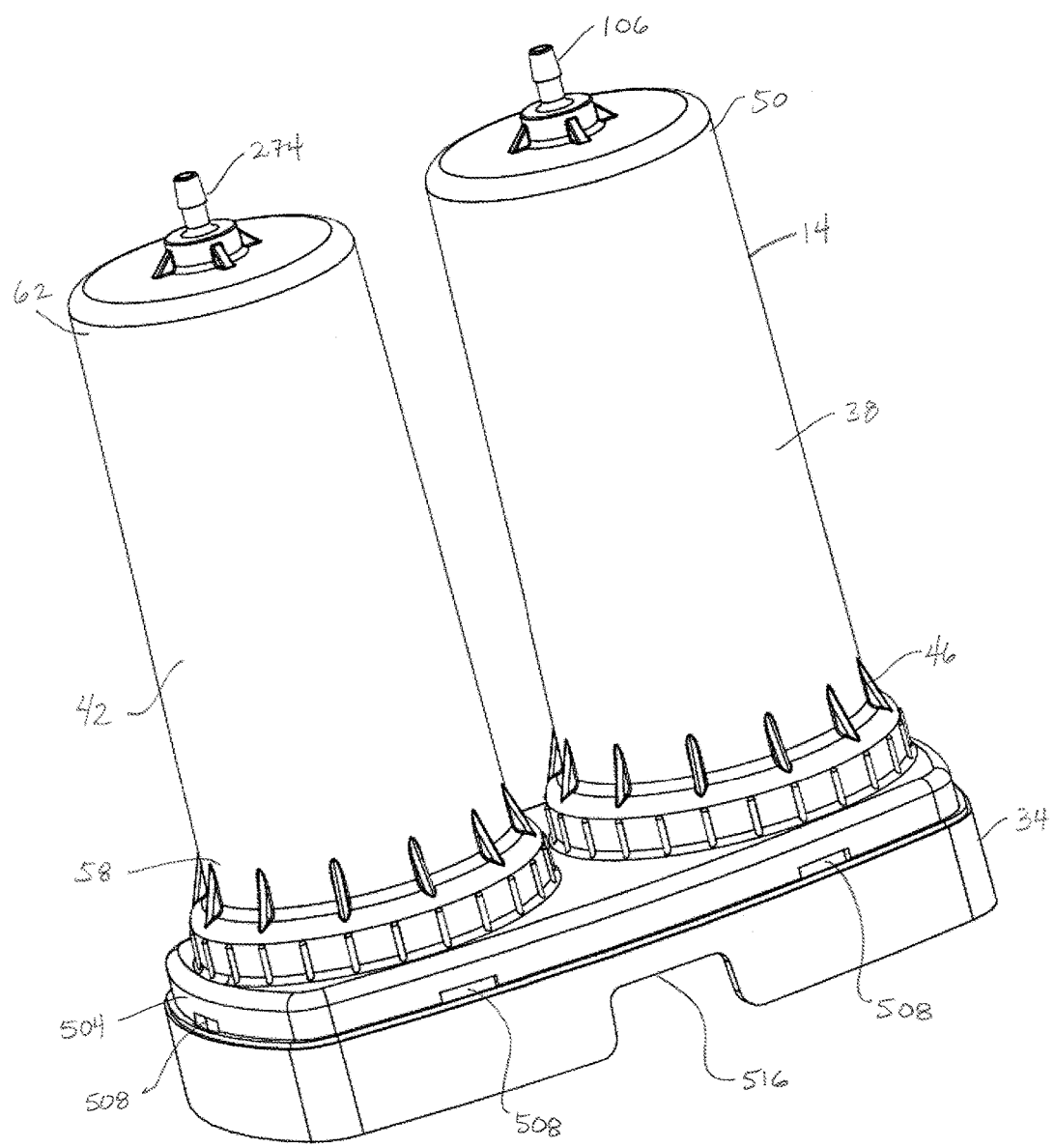
FIG. 5 is a perspective view of a filter housing of the assembly of FIGS. 1-3.

FIG. 4 illustrates a slight variation of assembly 10 and first filter assembly 18 in which filter cap 166 has been replaced with filter cap 166b (shown and described below with reference to FIGS. 25A-25C), though the numbering of first filter assembly 18 has been used, and though filter cap 166 could alternatively be used in place of filter cap 166b. The filter assembly is configured to be inserted into first filter chamber 54 such that filter cap 166b (or, as could alternatively be used, filter cap 166) faces first end 50 of portion 38.

In the embodiment of first filter assembly 18 with filter cap 166, when first filter assembly 18 is fully seated or received in chamber 54 (FIG. 18), protrusions 70 of housing 14 extend into corresponding recesses 226 of first filter cap 166, and nipple 202 of filter cap 166 extends into recess 98 of housing 14 such that the O-rings in grooves 206 provide a seal between nipple 202 and housing 14 to ensure that all or at least substantially all water that exits filter 170 will flow through passageway 114. Further, when first filter assembly 18 is fully seated or received in chamber 54 and housing cap 122 is coupled to housing 14 via threads 134 and 118, protrusion 146 of housing cap 122 contacts inner ends 258 of ridges 254 on filter cap 174 to retain first filter assembly 18 in filter chamber 54 and/or substantially prevent longitudinal movement of first filter assembly 18 (e.g., relative to housing 14). In use, inlet 26 can be coupled to a water source such that water entering inlet 26 can flow through passageway 162 in housing cap 122, between protrusion 146 of housing cap 122 and ridges 254 of filter cap 174, into the space in filter chamber 54 between filter 170 and housing 14, through filter material 186 into the central passageway of filter 170, through passageway 218 of nipple 202, and out of housing 14 through passageway 114 of secondary outlet 106 (flow path illustrated by arrows in FIG. 18).

In some embodiments, housing 14 includes only a base (such as base 34) and a single portion 38, such that secondary outlet 106 is a primary outlet that can be coupled (e.g., via a conduit) to a valve or other dispenser for dispensing filtered water received from outlet 106. However, in the embodiment shown, assembly 10 comprises a tube 270 extending from secondary outlet 106 to a secondary inlet 274 of second portion 42 of housing 14. In the embodiment shown, tube 270 is coupled to each of secondary outlet 106 and secondary inlet 274 with hose clamps 278. In the embodiment shown, second filter chamber 66 is configured to receive second filter assembly 22, which includes a third filter cap 282, a second filter 286 that is substantially similar to filter 170, and a fourth filter cap 290. As shown, third filter cap 282 is configured to be coupled to a first end 294 of filter 286, and fourth filter cap 290 is configured to be coupled to a second end 298 of filter 286. And as with filter 170, filter 286 comprises a filter material 302 (e.g., a filter fabric or other fibrous material, or any other suitable filter material) and a mesh or netting 306 surrounding the filter material In the embodiment shown, the overall configuration of second filter chamber 66 is similar in many respects to the configuration of filter chamber 54, with the primary exception of the internal structure of end 62, such that the differences will primarily be described for end 62.

Figure 7C:
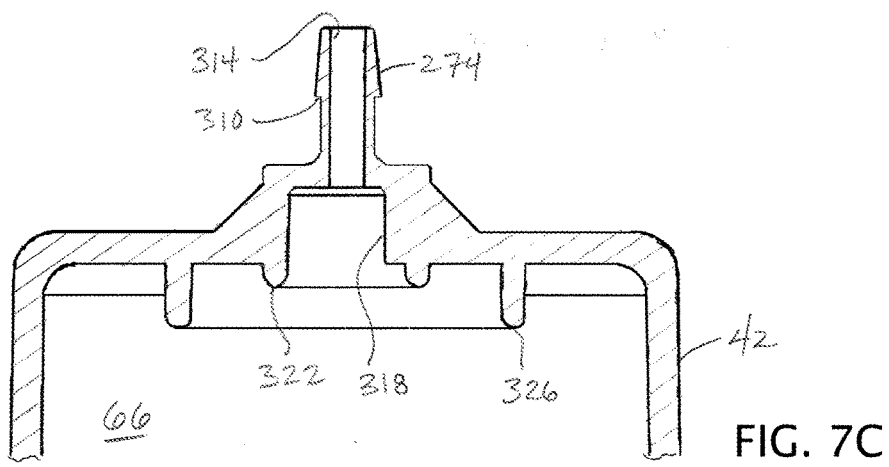
FIG. 7C is an enlarged cross-sectional plan view of a second portion of the housing of FIG. 4.
Figure 14:
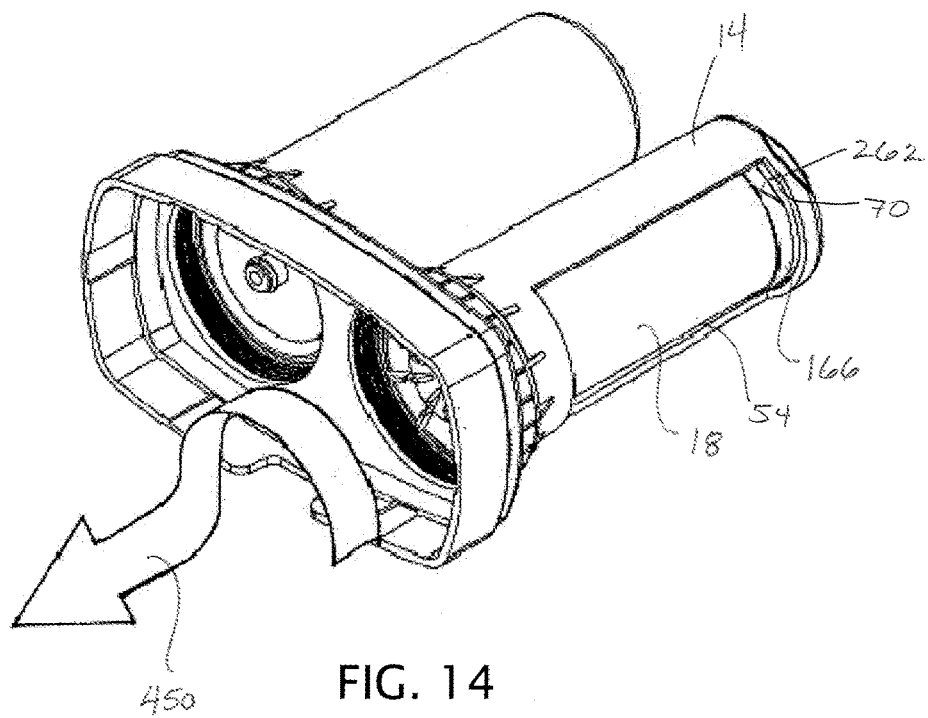
FIG. 14 is a perspective view of a portion of the assembly of FIGS. 1-3, illustrating the removal of a filter assembly from the housing.

As shown in FIG. 7C, end 62 of portion 42 (of housing 14) includes secondary inlet or nipple 274 that is substantially similar to secondary outlet or nipple 106 (e.g., secondary inlet 274 includes a tapered ridge 310 and a passageway 314 extending through secondary inlet 274 in communication with filter chamber 66). One difference in second end 62 of portion 42 is the omission of protrusions (e.g., 70). Instead, second end 62 of housing 14 includes a recess 318 with a non-circular cross-sectional shape (e.g., to prevent nipple 378 of filter cap 290, or nipple 202 of filter cap 166, from being inserted into recess 318, such as, for example, to prevent filter assembly 22 or 18 from being coupled to housing 14 in the wrong direction or orientation relative to housing 14). Another difference in second end 62 of portion 42 is the inclusion of a pair of circular ridges 322 and 326 protruding into chamber 66 toward first end 58, and concentric with each other and with passageway 314, with outer ridge 326 protruding further into chamber 66 than inner ridge 322. In the embodiment shown, outer ridge 326 is configured to contact filter cap 282 if second filter assembly 22 is fully received or seated in chamber 66, as described in more detail below.

As shown in FIGS. 10A-10D, third filter cap 282 has a first or inner end 330 configured to face filter 286, and a second or external end 334 configured to face away from filter 286. In the embodiment shown, inner end 330 of filter cap 282 includes a cylindrical projection 338 configured to extend into the central passageway of filter 286 (e.g., the outer diameter of projection 338 is substantially equal to the inner diameter of the central passageway in filter 286), and an annular recess 342 configured to receive a first end 294 of filter 286 (e.g., with an outer diameter substantially equal to the outer diameter of filter 286), both of which helping to ensure that filter 286 can be securely coupled in fixed relation to filter cap 282, at least when filter assembly 22 disposed in filter chamber 66. As shown, while projection 338 can include a recess 346, filter cap 282 does not include a passageway extending through projection 338, such that water is not permitted to flow through cap 282.

In the embodiment shown, outer end 334 of cap 282 includes a substantially flat central portion 350, and a plurality of ribs 354 projecting outward from end 334, and extending radially from portion 350 towards the circular perimeter of cap 282. In the embodiment shown, each rib includes a tapered inner end 358, a tapered outer end 362, and a recess 366 between inner end 358 and outer end 362. In the embodiment shown, recesses (or notches) 366 are each at an equal distance from the respective inner end 358, such that recesses 366 of ribs 354 lie in a circular path around portion 350. In the embodiment shown, recesses 366 are each formed such that the portion of the recess that is closest to end 334 is spaced above or apart from end 334, as shown. In the embodiment shown, the circular path on which recesses 366 are disposed has a diameter that is substantially equal to the diameter of outer ring 326 of portion 42 of housing 14, such that if filter assembly 22 is fully received or seated in chamber 66, outer ring 326 will extend into recesses 366 such that the space between outer end 334 of cap 282, and the height of outer ring 326 that exceeds the height of inner ring 322, cooperate to provide a space between outer ring 326 and outer end 334 of filter cap 282 through which water can flow from passageway 314, between ridges 354, and into filter chamber 66 (e.g., between filter 286 and portion 42 of housing 14).

As shown in FIGS. 11A-11D, fourth filter cap 290 has a first or inner end 370 configured to face filter 286, and a second or external end 374 configured to face away from filter 286. In the embodiment shown, filter cap 290 includes a nipple 378 projecting from second end 374, and configured to extend into recess (446) in a second housing cap (402) if filter assembly 22 is disposed in second filter chamber 22 and the second filter cap is coupled to housing 14. In the embodiment shown, nipple 378 includes one or more peripheral grooves 382, each configured to receive an O-ring to provide a seal between nipple 378 and the surface of the second housing cap (402) that defines the recess (446). In the embodiment shown, inner end 370 of filter cap 290 includes a cylindrical projection 386 configured to extend into the central passageway of filter 286 (e.g., the outer diameter of projection 386 is substantially equal to the inner diameter of the central passageway in filter 286), and an annular recess 390 configured to receive second end 298 of filter 286 (e.g., with an outer diameter substantially equal to the outer diameter of filter 286), both to help ensure that substantially all water flowing out second end 298 of filter 286 through the central passageway will flow through filter cap 290 (as described in more detail below), and to help ensure that filter 286 can be securely coupled in fixed relation to filter cap 290, at least when filter assembly 22 disposed in filter chamber 66. As shown, filter cap 290 further includes a passageway 394 extending through nipple 378 and projection 386 to permit water to flow through cap 290, as described in more detail below. As shown, cap 290 does not include recesses or cam surfaces, such that second filter assembly 22 differs from first filter assembly 18. Other embodiments can include two filter assemblies (e.g., 18) that are substantially similar.

In the embodiment shown (FIG. 6), an interior sidewall 398 of second portion 42 of housing 14 includes female threads 402 at or near first end 58, with threads 402 configured to engage a second housing cap 406 (FIGS. 13A-13D) that is configured to be coupled to the housing to retain second filter assembly 22 in filter chamber 66. In the embodiment shown, filter cap 406 has a circular shape, with a first outer end 410 and a second inner end 414. In the embodiment shown, inner end 414 includes male threads 418 configured to correspond to female threads 402 of housing 14; and outer end 410 that includes a central projection 422 (e.g., with a hexagonal shape, as shown, that can be engaged by a wrench or socket), and a pair of wings 424 configured to be grasped or pushed (e.g., by a user's hand) such as to rotate cap 406 relative to housing 14 to engage or disengage threads 418 and 402 when coupling or de-coupling cap 406 and housing 14. In the embodiment shown, inner end 414 of cap 406 includes a cylindrical projection 430 configured to extend into second filter chamber 66 when cap 406 is coupled to housing 14, and a plurality of ridges 434 extending radially outward from projection 430. As shown, projection 430 extends a distance 438 from ridges 434 that is less than distance 154 (FIG. 12D), such that projection 430 is shorter than projection 146 of first housing cap 122.

In the embodiment shown, projection 422 includes a stepped recess 442 configured to receive and permit sealing of a nipple fitting (outlet 30), such as, for example, via threads, adhesive, one or more O-rings, and/or the like. In other embodiments, recess 442 can have any suitable shape, and/or cap 406 and nipple 30 can be unitary. In the embodiment shown, projection 430 includes a recess 446 that is in fluid communication with recess 442, and that has a flared inner end 450. In the embodiment shown, recess 446 is configured to receive nipple 378 such than one or more O-rings in grooves 382 provide a seal between nipple 378 and the surface of housing cap 406 that defines recess 446 to direct substantially all water flowing through passageway 394 to outlet (nipple) 30.

As shown in FIG. 4, second filter assembly 22 is configured to be inserted into second filter chamber 66 such that filter cap 282 faces second end 62 of portion 42. In this embodiment, when second filter assembly 22 is fully seated or received in chamber 66, outer ring 326 of second portion 42 extend into recesses 366 of filter cap 282. Further, when second filter assembly 22 is fully seated or received in chamber 66 and housing cap 406 is coupled to housing 14 via threads 418 and 402, nipple 378 of filter cap 290 extends into recess 450 of housing cap 406 to retain second filter assembly 22 in filter chamber 66 and/or substantially prevent longitudinal movement of second filter assembly 22 (e.g., relative to housing 14). In use, water from tube 270 can flow through passageway 314 of secondary inlet 274, between outer ring 326 of portion 42 and outer end 334 of filter cap 282, and between ridges 354 of filter cap 282, into the space in filter chamber 66 between filter 286 and housing 14, through filter material 302 into the central passageway of filter 286, through passageway 394 of nipple 378, and out of housing 14 through outlet 30 (flow path illustrated by arrows in FIG. 18).

Some embodiments of the present systems include two housings 14 "daisy chained" together with the outlet (30) of the first housing coupled to the inlet (26) of the second housing, and the outlet (30) of the second housing acting as the overall outlet for the system. Other embodiments include more than two filter housings 14 similarly "daisy chained" together.

As discussed above and depicted in FIG. 14, first filter assembly 18 is configured (e.g., via filter cap 166) to be rotated relative to housing to cause a cam surface 262 (e.g., of filter cap 166) to contact a protrusion of housing 14 to urge filter cap 166 (and first filter assembly 18) away from protrusion 70 and out of filter chamber 54, as indicated by arrow 454. In other embodiments, the filter housing can be configured to include one or more recesses and/or cam surfaces, and the first filter assembly can be configured to include one or more protrusions that function similarly to those described above. Further, while the present embodiment includes four protrusions 70 and a corresponding number of recesses 266 and cam surfaces 262, other embodiments can include any number of protrusions, recesses, and/or cam surfaces (e.g., 1, 2, 3, 5, or more) that permit an apparatus and/or assembly to function as described in this disclosure (e.g., with rotation of the filter assembly urging the filter assembly out of the corresponding filter chamber or away from a filter housing to which the filter assembly is coupled).

Figure 15:
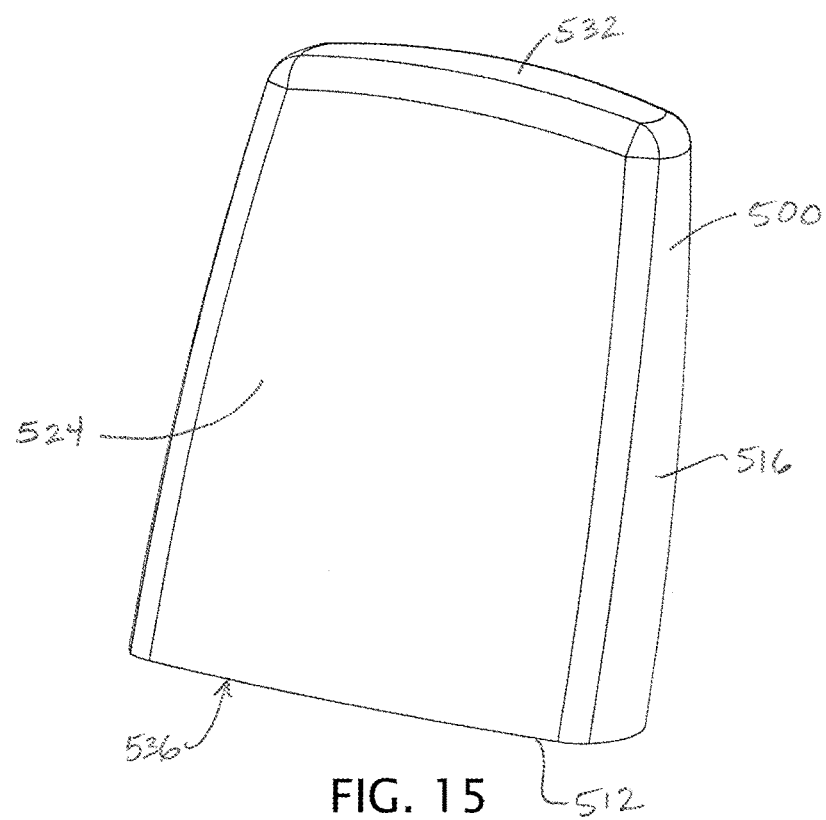
FIG. 15 is a perspective view of a shroud configured to be coupled to the filter housing of FIG. 4.
Figure 16:
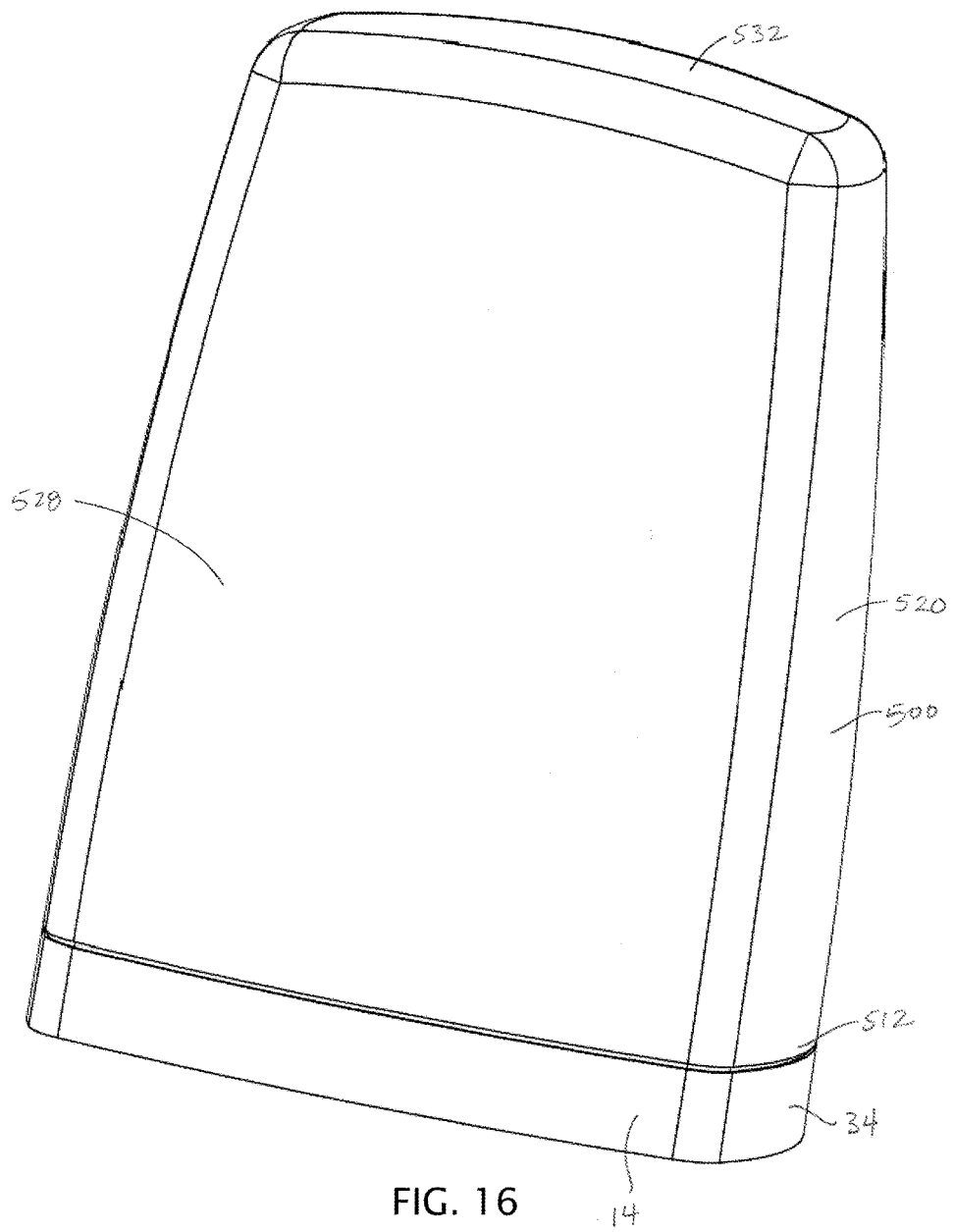
FIG. 16 is a perspective view of the shroud of FIG. 15 coupled to the assembly of FIGS. 1-3.
Figure 17:
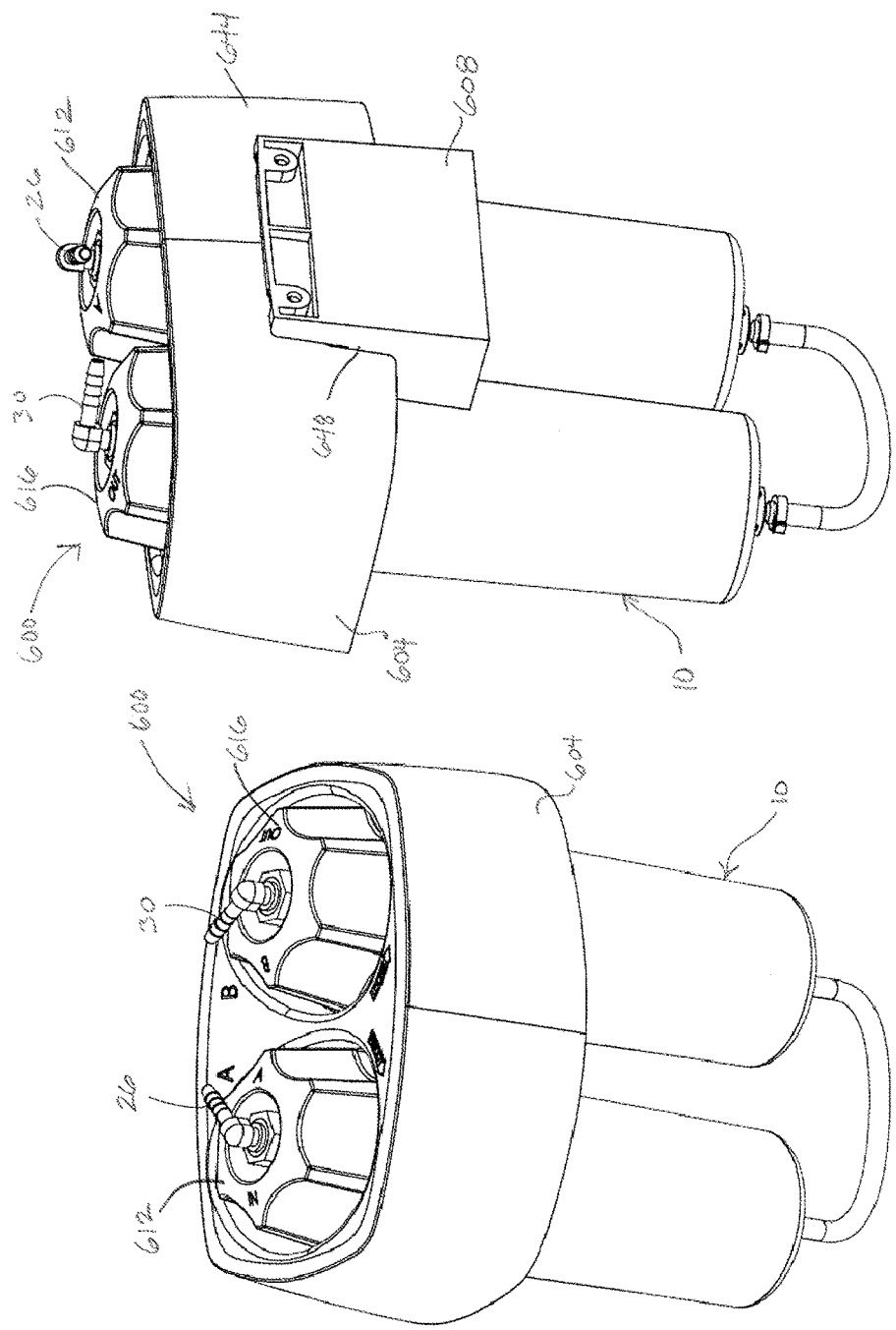
FIGS. 17A-17B are front and rear perspective views of an undermount configuration of the assembly of FIGS. 1-3.

Referring now to FIGS. 1, 5, and 15-16, filter housing 14 can be configured to be coupled to a shroud 500 configured to be coupled to cover at least a portion of the filter housing (FIGS. 15-16). For example, in the embodiment shown, base 34 of housing 14 includes a narrowed peripheral portion 504 including one or more (e.g., a plurality of, as shown) projections and/or recesses 508. In the embodiment shown, shroud 500 includes a hollow interior with a first end 512 shaped to correspond to portion 504 of base 34 of the housing, and includes one or more recesses and/or protrusions (not shown, but similar to 508) configured to correspond to (receive or extend into) one or more projections and/or recesses 504 of base 34 of the housing. In the embodiment shown, shroud 500 includes a first side 516, a second side 520 that is substantially identical to first side 516, a front 524, a back 528 that is substantially identical to front 524, a top 532, and a hollow bottom 536 defined by a relatively thin sidewall of shroud 500 (e.g., with the thickness of the sidewall defined by the differences in widths between the outer surfaces of sides 516 and 520, and between the corresponding outer surfaces of portion 504 of base 34 of the housing, and the differences in depths between front 524 and back 528, and between the corresponding outer surfaces of portion 504). In the embodiment shown, base 34 of the housing further includes a recess 532 configured to permit the inlet and outlet tubes to pass through recess 540, such as, for example, if assembly 10 is disposed on a surface with base 34 facing down and in contact with the surface.

Referring now to FIGS. 17A-23C, shown therein is assembly 10 with a mounting kit 600 for mounting assembly 10 on a vertical surface (e.g., a wall, an interior or exterior side of cabinet, or nearly any other vertically oriented surface). In the embodiment shown, kit 600 comprises a shroud 604, a housing mount 608, a first extension cap 612, and a second extension cap 616. In the embodiments shown, shroud 604 includes an upper end 620, a lower end 624, and two tapered projections 628 extending from upper end 620 toward lower end 624, each projection 628 including an opening 632 having a diameter substantially equal to or larger than the diameter of a corresponding one of housing cap 122 or housing cap 406. In the embodiment shown, tapered projections 628 are configured to extend into base 34 of housing 14 such that one of openings 632 aligns with one of housing cap 122 and housing cap 406. In the embodiment shown, shroud 604 can be coupled to housing 14 by an adhesive or connector (e.g., screw, rivet, etc.) between projections 628 and base 34 of the housing, or by coupling extension caps 612 and 616 with diameters larger than the diameters of openings 632 to housing caps 122 and 406, respectively, as shown. As also shown, extension caps 612 and 616 are configured to be coupled to housing caps 122 and 406 to extend inlet 26 and outlet 30 to a point at which they are accessible (e.g., to a user) while shroud 604 is coupled to housing 14. In some embodiments, shroud 604 is configured to be coupled to housing 14 such the shroud extends over the base portion. For example, in the embodiment shown, shroud 504 includes a sidewall 636 having an inner portion 640 defining projections 628, and an outer portion 644, and is configured to be coupled to housing 14 such that at least part of base 34 of the housing is between inner and outer portions 640 and 644 of sidewall 636, and such that all of base 34 is within outer portion 644 of sidewall 636. In the embodiment shown, outer portion 644 of sidewall 636 of the shroud includes a recess 648 configured to receive housing mount 608, as shown in FIG. 17B. FIG. 18 illustrates above-described central passageway 646 of filter 170, and central passageway 650 of filter 286.

In the embodiment shown, housing mount 608 has an upper side 652, a lower side 656, an inner end 660, and an outer end 664. As shown, inner end 660 can include a substantially flat or planar portion 668 for contacting a vertical surface upon which housing mount 608 is to be mounted, such as, for example, by way of screws extending through holes 672 in inner end 660 of mount 608. In the embodiment shown, mount 608 further includes a slot 676 between inner end 660 and outer end 664 (e.g., closer to inner end 660), the slot configured to receive a part of sidewall 636 of shroud 604 that defines recess 648 (e.g., such that lateral movement of shroud 604 relative to mount 608 is substantially prevented). In some embodiments, mount 608 between outer end 664 and inner end 660 can be configured to correspond in shape to one or more portion of assembly 10. For example, in the embodiment shown, mount 608 includes curved side surfaces 608 corresponding in shape to first and second portions 38 and 42 of housing 14, such that outer end 664 can extend between portions 38 and 42, and such that surfaces 680 can contact the outer surfaces of portions 38 and 42 to support assembly 10 and/or restrict movement of housing 14 and/or shroud 604 relative to mount 608.

As shown in FIGS. 22A-22C, first extension cap 612 has a first or inner end 684 configured to face housing cap 122, and a second or external end 688 configured to face away from housing cap 122. In the embodiment shown, inner end 684 includes a recess 692 configured to receive protrusion 138 of housing cap 122, and a plurality of ridges 696 extending into recess 692 to provide a press-fit connection between extension cap 612 and protrusion 138 of housing cap 122. Some embodiments can additionally or alternatively include another mechanical connection and/or an adhesive between extension cap 612 and housing cap 122. In the embodiment shown, inner end 684 also includes a cylindrical stem or protrusion 700 extending out of recess 692, and a passageway 704 extending through stem 700 through extension cap 612. In the embodiment shown, stem 700 is configures to extend into recess 158 of housing cap 122 if extension cap 612 is coupled to housing cap 122, such that passageway 704 is in communication with recess 162 of housing cap 122. In the embodiment shown, one or more O-rings and/or other structures 708 can be provided between stem 704 and the portion of housing cap 122 defining recess 158 to seal, and/or further strengthen the physical coupling between, stem 704 and housing cap 122. In the embodiment shown, inner end 688 of extension cap 612 also includes a plurality of ridges 712 extending radially from recess 692, as shown, and two sets of ridges 716 defining radially extending recesses 720 configured to receive wings 142 of housing cap 122. In the embodiment shown, when extension cap 612 is coupled to housing cap 122, as shown in FIGS. 22A and 22B, ridges 716 contact wings 142 to provide additional strength between extension cap 612 and housing cap 122, such as, for example, when rotating the caps relative to the housing to couple housing cap 122 to the housing. In the embodiment shown, outer end 684 of extension cap 612 includes a recess 724, a protrusion 728 in recess 724, and a generally knob-shaped exterior with a plurality of indents 732 configured be grasped by a user when turning extension cap 612 and housing cap 122. As shown, protrusion 728 has an outer end 736 that is substantially similar to protrusion 158 of housing cap 122, as described above, and includes a stepped recess 740 that is substantially similar to recess 158 of cap 122 (e.g., is configured to receive and permit sealing of a nipple fitting (inlet 26), such as, for example, via threads, adhesive, one or more O-rings, and/or the like).

As shown in FIGS. 23A-23C, second extension cap 616 has a first or inner end 744 configured to face housing cap 406, and a second or external end 748 configured to face away from housing cap 406. In the embodiment shown, inner end 744 includes a recess 752 configured to receive protrusion 422 of housing cap 406, and a plurality of ridges 756 extending into recess 752 to provide a press-fit connection between extension cap 616 and protrusion 422 of housing cap 406. Some embodiments can additionally or alternatively include another mechanical connection and/or an adhesive between extension cap 616 and housing cap 406. In the embodiment shown, inner end 744 also includes a cylindrical stem or protrusion 760 extending out of recess 752, and a passageway 764 extending through stem 760 and through extension cap 616. In the embodiment shown, stem 760 is configured to extend into recess 442 of housing cap 406 if extension cap 616 is coupled to housing cap 406, such that passageway 764 is in communication with recess 446 of housing cap 406. In the embodiment shown, one or more O-rings and/or other structures 768 can be provided between stem 764 and the portion of housing cap 406 defining recess 442 to seal, and/or further strengthen the physical coupling between, stem 764 and housing cap 406. In the embodiment shown, inner end 744 of extension cap 616 also includes a plurality of ridges 772 extending radially from recess 752, as shown, and two sets of ridges 776 defining radially extending recesses 780 configured to receive wings 426 of housing cap 406. In the embodiment shown, when extension cap 616 is coupled to housing cap 406, as shown in FIGS. 23A and 223B, ridges 776 contact wings 426 to provide additional strength between extension cap 616 and housing cap 406, such as, for example, when rotating the caps relative to the housing to couple housing cap 406 to the housing. In the embodiment shown, outer end 748 of extension cap 616 includes a recess 784, a protrusion 788 in recess 784, and a generally knob-shaped exterior with a plurality of indents 792 configured be grasped by a user when turning extension cap 616 and housing cap 406. As shown, protrusion 788 has an outer end 796 that is substantially similar to protrusion 422 of housing cap 406, as described above, and includes a stepped recess 800 that is substantially similar to recess 442 of cap 406 (e.g., is configured to receive and permit sealing of a nipple fitting (outlet 30), such as, for example, via threads, adhesive, one or more O-rings, and/or the like).

Figures 25A, 25B, 25C:
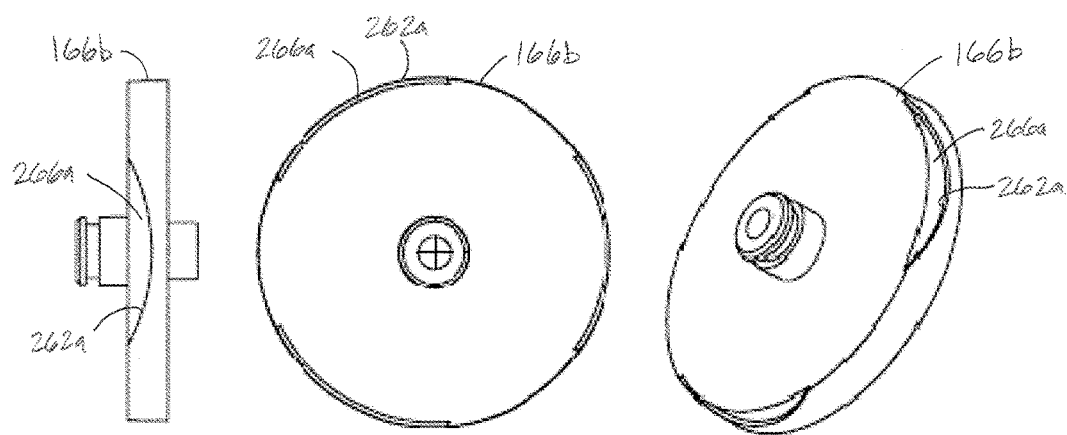
Figures 26A, 26B, 26C:
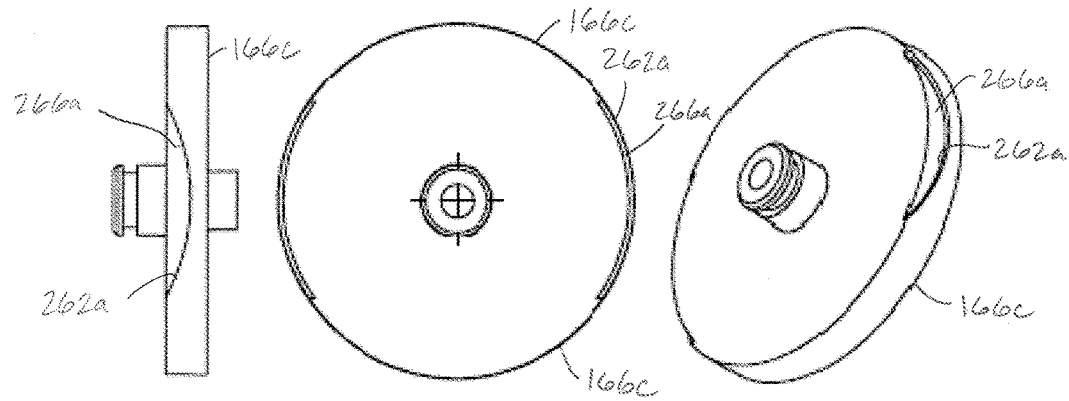
Figures 27A, 27B, 27C:
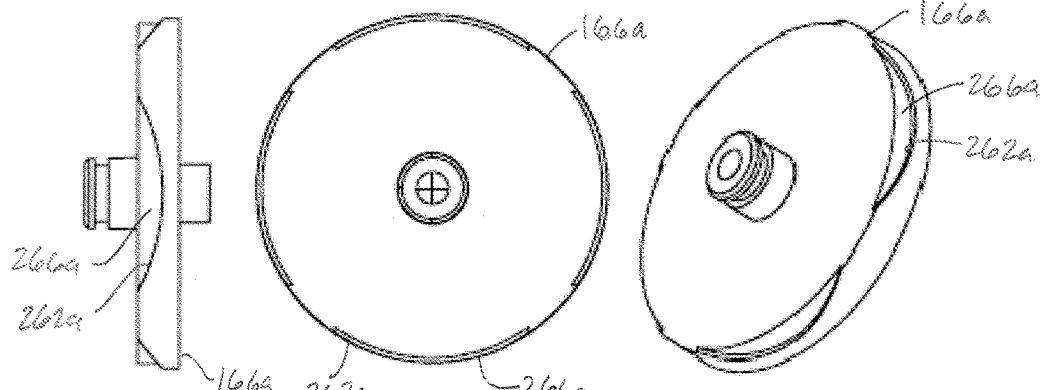

FIGS. 27A-27C show an alternate embodiment 166a of the first filter cap. Filter cap 166a is substantially similar to filter cap 166, with the primary exception being that recesses 266a are curved such that each recess 266a defines a single cam surface 262a. With such an embodiment, protrusions 70 may need to be modified to shorten the protrusions (e.g., by rounding or curving tip 78). FIGS. 25A-25C show an another alternate embodiment 166b of the first filter cap. Filter cap 166b is substantially similar to filter cap 166a, with the primary exception being that filter cap 166b includes only three recesses 266a. FIGS. 26A-26C show another alternate embodiment 166c of the first filter cap. Filter cap 166c is substantially similar to filter caps 166a and 166b, with the primary exception being that filter cap 166c includes only two recesses 266a. With filter caps 166b and 166c, housing 14 may need to be further modified to include a number of protrusions that corresponds to the number of recesses 266a and cam surfaces 262a.

The structures of the present systems, assemblies, and apparatuses, such as the housing and housing caps, the filter caps, and the shrouds can be made with standard materials (e.g., plastic) using standard manufacturing techniques (e.g., injection molding), and/or are commercially available for purchase (e.g., O-rings, nipple fittings, seals, etc.).

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure (e.g., inlet 26, housing cap 122, and/or extension cap 612; outlet 30, housing cap 406, and/or extension cap 616), and/or connections may be substituted (e.g., threads may be substituted with press-fittings or welds). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system comprising:
a filter housing configured to be coupled to at least a first filter assembly having one or more cam surfaces, the filter housing having an inlet, an outlet, and a protrusion;
where the first filter assembly is configured to be coupled to the filter housing such that rotation of the first filter assembly in either of a clockwise or counterclockwise direction relative to the filter housing will cause at least one of the one or more cam surfaces to interact with the protrusion and thereby urge the first filter assembly away from the protrusion and;
wherein the protrusion includes a first side angled in a first direction and a second side angled in a second direction substantially opposite the first direction, the first side contacting one of the one or more cam surfaces, which is oriented in the first direction, when the first filter assembly is rotated in the clockwise direction relative to the first filter housing and the second side contacting another of the one or more cam surfaces, which is oriented in the second direction, when the first filter assembly is rotated in the counterclockwise direction relative to the first filter housing.

2. The system of claim 1, where the filter housing is configured to be coupled to two or more filter assemblies, the system further comprising:
a second filter assembly configured to be coupled to the filter housing.

3. The system of claim 2, where the second filter assembly is different than the first filter assembly.

4. The system of claim 1, where the filter housing has a first filter chamber configured to receive the first filter assembly; and where the system further comprises:
a housing cap configured to be coupled to the housing to retain the first filter assembly in the first filter chamber.

5. The system of claim 4, where the filter housing also has a second filter chamber, the system further comprising:
a second filter assembly configured to be received in the second filter chamber.

6. The system of claim 1, where the filter housing has three or more protrusions; and the first filter assembly has three or more cam surfaces; and
where the first filter assembly is configured to be coupled to the filter housing such that if the first filter assembly is rotated relative to the filter housing, the cam surfaces will contact the protrusions to urge the first filter assembly away from the protrusions.

7. The system of claim 1, further comprising a shroud configured to be coupled to the filter housing to cover at least a portion of the filter housing.

8. The system of claim 7, where the filter housing has a base portion and a distal portion spaced apart from the base portion, and the shroud is configured to extend over the base portion.

9. The system of claim 8, where the shroud is configured to be coupled to a housing mount to suspend the shroud and the filter housing from the housing mount.

10. The system claim 1, where the first filter assembly includes a first filter cap with a circular perimeter, and each cam surface extends inward from the circular perimeter.

11. The system of claim 10, where each cam surface is helical.

12. The system of claim 10, where the first filter cap includes a first end, a second end, and a plurality of recesses extending inwardly from the circular perimeter between the first end and the second end, each recess defining at least one cam surface.

13. The system of claim 1, wherein the filter housing is a first filter housing, and further comprising:
a second filter housing that is substantially similar to the first filter housing; and
a second filter assembly that is substantially similar to the first filter assembly;
where the first filter housing is configured to be coupled to the second filter housing.

14. The apparatus of claim 1, where the one or more cam surfaces is helical and the interaction between the one or more cam surfaces and the protrusion thereby urges the filter assembly in a direction out of the filter housing.

15. The apparatus of claim 14, where the protrusion exerts a force on the one or more cam surfaces.

16. The system of claim 1, wherein the one or more surfaces include a first opposing cam surface angled in a first direction and a second opposing cam surface angled in a second direction substantially opposite the first direction, and wherein:
when the first filter assembly is rotated in the clockwise direction relative to the first filter housing, one of the first opposing cam surface and the second opposing cam surface contacts the protrusion and urges the first filter assembly away from the protrusion, and
when the first filter assembly is rotated in the counterclockwise direction relative to the first filter housing, and the other of the first opposing cam surface and the second opposing cam surface contacts the protrusion and urges the first filter assembly away from the protrusion.

17. An apparatus comprising:
a first filter cap configured to be coupled to a filter as at least part of a filter assembly, the first filter cap comprising one or more cam surfaces configured such that if the filter assembly is disposed in a filter chamber of a filter housing having a protrusion extending into the filter chamber, rotation of the first filter cap in either of a clockwise or counterclockwise direction relative to the filter housing will cause at least one of the one or more cam surfaces to interact with the protrusion and thereby urge the first filter cap away from the protrusion and;
wherein the protrusion includes a first side angled in a first direction and a second side angled in a second direction substantially opposite the first direction, the first side contacting one of the one or more cam surfaces, which is oriented in the first direction, when the first filter assembly is rotated in the clockwise direction relative to the first filter housing and the second side contacting another of the one or more cam surfaces, which is oriented in the second direction, when the first filter assembly is rotated in the counterclockwise direction relative to the first filter housing.

18. The apparatus of claim 17, where the filter comprises three or more cam surfaces configured such that if the filter assembly is disposed in a filter chamber of a filter housing having three or more protrusions extending into the filter chamber, the first filter cap can be rotated in either direction relative to the filter housing to cause at least three of the three or more cam surfaces to each contact one of the protrusions and urge the first filter cap away from the protrusion.

19. The apparatus of claim 17, where the first filter cap has a circular perimeter, and each cam surface extends inward from the circular perimeter.

20. The apparatus of claim 19, where each cam surface is helical.

21. The apparatus of claim 19, where the first filter cap includes an first end, a second end, and a plurality of recesses extending inward from the circular perimeter between the first end and the second end, each recess defining at least one cam surface.

22. The apparatus of claim 17, further comprising:
a filter having a first end and a second end;
where the filter cap is coupled to the first end of the filter.

23. The apparatus of claim 17, where the one or more cam surfaces is helical and the interaction between the one or more cam surfaces and the protrusion thereby urges the first filter cap in a direction out of the filter housing.

24. The apparatus of claim 23, where the protrusion exerts a force on the one or more cam surfaces.

25. The apparatus of claim 17, wherein the one or more cam surfaces include a first opposing cam surface angled in a first direction and a second opposing cam surface angled in a second direction substantially opposite the first direction, and wherein:
when the first filter assembly is rotated in the clockwise direction relative to the first filter housing, one of the first opposing cam surface and the second opposing cam surface contacts the protrusion and urges the first filter assembly away from the protrusion, and
when the first filter assembly is rotated in the counterclockwise direction relative to the first filter housing, and the other of the first opposing cam surface and the second opposing cam surface contacts the protrusion and urges the first filter assembly away from the protrusion.

26. An apparatus comprising:
a first filter cap configured to be coupled to a filter as at least part of a filter assembly, the first filter cap comprising a first opposing cam surface angled in a first direction and a second opposing cam surface angled in a second direction substantially opposite the first direction, the first and second opposing cam surfaces configured such that if the filter assembly is disposed but not retained in a filter chamber of a filter housing having one or more protrusions extending into the filter chamber, the first filter cap can be rotated in a clockwise direction relative to the filter housing to cause one of the first opposing cam surface and the second opposing cam surface to interact with the protrusion and the first filter cap can be rotated in a counterclockwise direction relative to the filter housing to cause the other of the first opposing cam surface and the second opposing cam surface to interact with the protrusion and thereby urge the first filter cap away from the protrusion and;
wherein the protrusion includes a first side angled in a first direction and a second side angled in a second direction substantially opposite the first direction, the first side contacting one of the one or more cam surfaces, which is oriented in the first direction, when the first filter assembly is rotated in the clockwise direction relative to the first filter housing and the second side contacting another of the one or more cam surfaces, which is oriented in the second direction, when the first filter assembly is rotated in the counterclockwise direction relative to the first filter housing.

27. The apparatus of claim 26, where the one or more cam surfaces is helical and the interaction between the one or more cam surfaces and the protrusion thereby urges the first filter cap in a direction out of the filter housing.

28. The apparatus of claim 27, where the protrusion exerts a force on the one or more cam surfaces.

* * * * *